US010072630B2

(12) United States Patent
Bein

(10) Patent No.: US 10,072,630 B2
(45) Date of Patent: Sep. 11, 2018

(54) OCEAN WAVE ENERGY ABSORBING KITE SYSTEM AND METHOD

(71) Applicant: Thomas W Bein, Gambrills, MD (US)

(72) Inventor: Thomas W Bein, Gambrills, MD (US)

( * ) Notice: Subject to any disclaimer, the term of this patent is extended or adjusted under 35 U.S.C. 154(b) by 0 days.

(21) Appl. No.: 15/632,990

(22) Filed: Jun. 26, 2017

(65) Prior Publication Data

US 2017/0292493 A1 Oct. 12, 2017

Related U.S. Application Data

(60) Division of application No. 14/995,587, filed on Jan. 14, 2016, now Pat. No. 9,752,553, which is a continuation of application No. PCT/US2014/056454, filed on Sep. 19, 2014.

(60) Provisional application No. 61/880,643, filed on Sep. 20, 2013.

(51) Int. Cl.
*F03B 13/18* (2006.01)
*F03B 13/10* (2006.01)
*F03B 13/14* (2006.01)

(52) U.S. Cl.
CPC .......... *F03B 13/1885* (2013.01); *F03B 13/10* (2013.01); *F03B 13/14* (2013.01); *F05B 2240/311* (2013.01)

(58) Field of Classification Search
CPC ......... Y02E 10/38; Y02E 10/28; F03B 13/20; F03B 13/1885; F03B 13/10; F03B 13/14; F05B 2240/311
USPC ..................................................... 290/42, 53
See application file for complete search history.

(56) References Cited

U.S. PATENT DOCUMENTS

| | | | | |
|---|---|---|---|---|
| 1,960,622 A | * | 5/1934 | Du Pont | F03B 13/182 416/6 |
| 4,170,738 A | * | 10/1979 | Smith | F03B 13/185 185/30 |
| 4,371,788 A | * | 2/1983 | Smith, Jr. | F03B 13/185 290/42 |
| 6,731,018 B1 | * | 5/2004 | Grinsted | F03B 17/06 290/42 |
| 6,756,695 B2 | * | 6/2004 | Hibbs | F03B 13/183 290/42 |
| 7,023,104 B2 | * | 4/2006 | Kobashikawa | B01D 61/10 290/42 |

(Continued)

FOREIGN PATENT DOCUMENTS

WO   WO 2010122292 A2 * 10/2010 .............. F03D 5/00

*Primary Examiner* — Tulsidas C Patel
*Assistant Examiner* — Charles Reid, Jr.
(74) *Attorney, Agent, or Firm* — McKinney & Associates, LLC; J. Andrew McKinney, Jr.

(57) ABSTRACT

An ocean wave energy absorbing kite system 200 captures an ocean wave's kinetic energy as a force on a submerged, reciprocating panel 202 that drives the panel back and forth in an oscillating motion. The force applied to the panel is transmitted to a power generator 244 through opposed flexible ropes or lines 214, 224 loaded in tension. Potential energy is captured from the wave as a vertical force when a buoyant volume attached to the energy absorbing panel or kite member 202 rises on a passing ocean wave's peak, and transmits the force through flexible ropes or lines in tension to a power generator. Optionally, the shape of the panel is configurable to limit or restrict absorbed wave energy, thereby preventing damage from larger storm-generated waves.

6 Claims, 17 Drawing Sheets

(56) References Cited

U.S. PATENT DOCUMENTS

| | | | | |
|---|---|---|---|---|
| 8,018,079 | B2* | 9/2011 | Kelly | F03D 5/04 290/1 R |
| 2002/0040948 | A1* | 4/2002 | Ragner | A63H 27/002 244/153 R |
| 2007/0120004 | A1* | 5/2007 | Olson | F03D 5/00 244/10 |
| 2007/0228738 | A1* | 10/2007 | Wrage | F03D 5/00 290/44 |
| 2008/0093852 | A1* | 4/2008 | Vowles | F03B 13/14 290/42 |
| 2009/0056327 | A1* | 3/2009 | Raikamo | F03B 13/181 60/506 |
| 2009/0140524 | A1* | 6/2009 | Kejha | F03B 13/264 290/54 |
| 2010/0111609 | A1* | 5/2010 | Espedal | F03B 13/182 405/76 |
| 2010/0264270 | A1* | 10/2010 | Mears | B64D 17/025 244/123.11 |
| 2010/0276934 | A1* | 11/2010 | Francis | F03B 17/06 290/54 |
| 2010/0295302 | A1* | 11/2010 | Martin | F03B 17/06 290/43 |
| 2011/0031750 | A1* | 2/2011 | Kreissig | F03B 13/1885 290/53 |
| 2011/0210559 | A1* | 9/2011 | Zanetti | F03D 5/06 290/55 |
| 2011/0298215 | A1* | 12/2011 | Wille | F03B 13/18 290/53 |
| 2012/0212350 | A1* | 8/2012 | Magnell | F03B 13/10 340/850 |
| 2013/0008158 | A1* | 1/2013 | Hon | F03B 13/1815 60/506 |

* cited by examiner

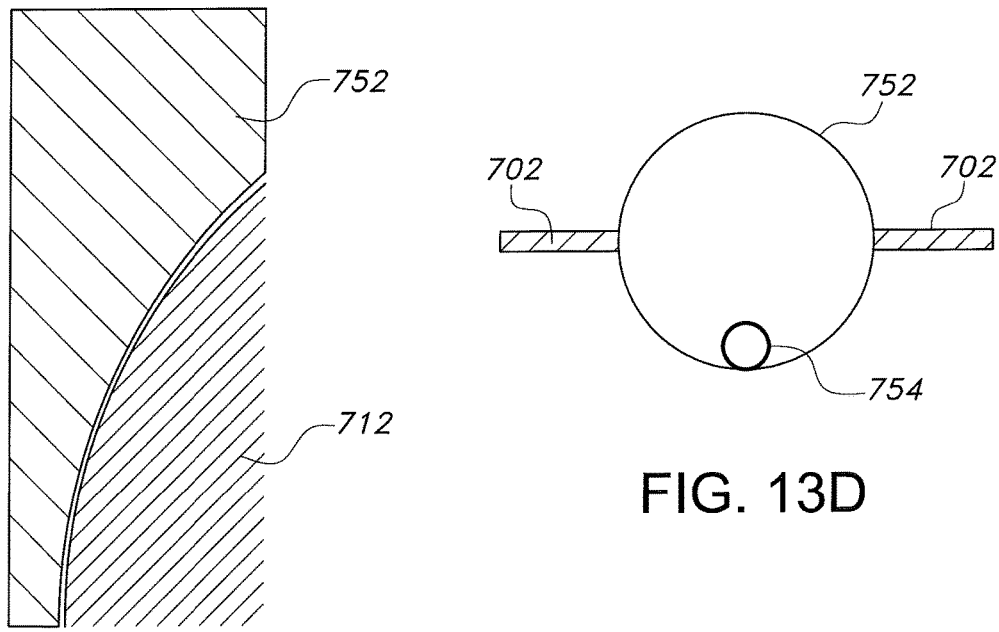
FIG. 13E
FIG. 13D
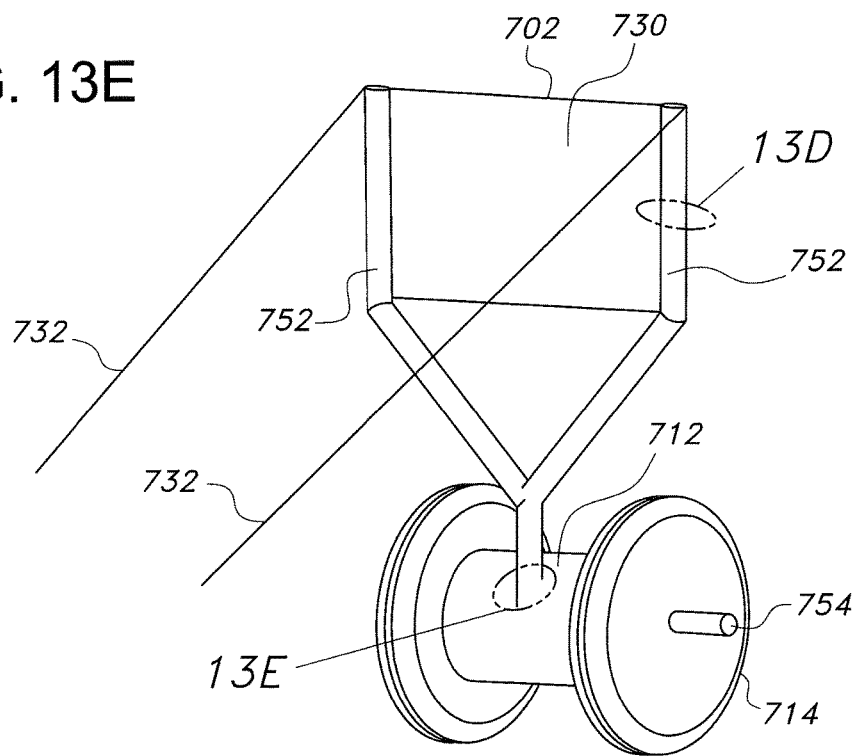
FIG. 13C

OCEAN WAVE ENERGY ABSORBING KITE SYSTEM AND METHOD

RELATED APPLICATION INFORMATION AND PRIORITY CLAIM

This is a Divisional application which claims priority under 35 U.S.C. 120 to U.S. Continuation application Ser. No. 14/995,587 which claims priority under 35 U.S.C. 120 and 35 U.S.C.111(a) as a U.S. Continuation of International Application No. PCT/US2014/056454, filed on Sep. 19, 2014, entitled "Ocean Wave Energy Absorbing Kite Apparatus and Method," which claims priority from U.S. Provisional Application No. 61/880,643, filed Sep. 20, 2013, entitled "Ocean Wave Energy Absorbing Kite Apparatus and Method for efficiently harnessing Kinetic and Potential Energy of a wave to Generate Power," the entire contents of which are hereby incorporated by reference.

FIELD OF THE INVENTION

The present invention relates generally to ocean wave energy converters and more specifically to an ocean wave energy power generation system that efficiently harnesses the kinetic and potential energy of ocean waves to produce power.

BACKGROUND

Ocean waves that reach the shoreline of a land mass are primarily generated by wind pushing on the water surface far from land, but the energy contained in such waves is unpredictable, for a number of reasons. Unlike the predictable energy that can be extracted from water motion that is caused by tides, wave energy is subject to numerous modifying factors. For example, typically the wind will generate multiple waves which interact with each other in a random pattern, forming what is referred to as a fully developed sea. Accordingly, wave energy converters, unlike tide energy converters, must be able to adjust to different wave characteristics so that a maximum amount of energy can be extracted.

The surface of a single wave as it moves across the ocean bottom can be broadly described mathematically as equivalent to sinusoidal motion. However, it can be observed from the motion of the water surface that there are both vertical and horizontal vector components of velocity in a wave. The vertical component of velocity causes the wave to rise above and to fall below a mean waterline, while the horizontal component of wave velocity causes the wave crest to move in the direction of the wave propagation. It is less obvious that there is also a horizontal component of velocity opposite to the direction of wave propagation. These velocities can be depicted as four points along a wave in its direction of propagation, where the velocities are either horizontal or vertical. At the point of maximum wave amplitude, referred to as the wave peak, the velocity is horizontal in the direction of the wave propagation. Moving forward of the wave peak to the mean water line the velocity is vertically upward. At a point of minimum wave amplitude, referred to as the wave trough, the velocity is horizontal in the direction opposite to the wave propagation. Returning to the mean water line, the velocity is vertically downward.

The combination of these velocity vectors creates a circular velocity pattern, referred to as the orbital velocity. In deep water, the energy of a wave is split between the potential energy, which is the vertical motion in the direction of the rise and fall of the water surface, and the kinetic energy, which is the motion of the water parallel to the direction of wave propagation. The orbital velocities are strongest at the surface and decay down to zero at a depth of approximately one-half the wavelength, which is the distance between the peaks (or the valleys) of adjacent waves. In shallow water, where the water depth is less than one-half the wave length, the orbital velocities extend down to the ocean bottom. As the water depth becomes shallower than one-half of the wave length, the orbital velocity paths are compressed in the vertical direction, which flattens the paths into ovals.

The power in a single wave, per unit length of the wave ("Wave Power", University of Strathclyde, 2001), can be expressed as:

$$P = \frac{\rho * g^2 * a^2 * T}{8 * \pi}$$

Where:

$P$ = power (kW/m)

$\rho$ = the water density (kg/m$^3$)

$g$ = acceleration of gravity (m/sec$^2$)

$a$ = Wave amplitude (m)

$T$ = Wave period (sec)

$\pi$ = constant = 3.14159

From inspection of the equation above, it can be seen that the power of the wave corresponds to the wave amplitude squared. The wave amplitude is defined as the distance from the undisturbed mean water line to the top of the wave. The consequence of this relationship to a wave energy converter is that waves which are one-half the design wave amplitude will produce one-quarter the power. Similarly, wave amplitudes which are twice the design wave amplitude will result in four times the power. From this relationship it is recognized that the waves generated during a storm can easily overpower a wave energy converter designed for a typical wave height.

Numerous wave energy converters have been proposed and put into service. The devices strive to capture either the kinetic energy of a wave, the potential energy, or a combination of the two. Prior art wave energy converters can be divided into groups defined by how the wave energy is captured or absorbed. These groups are:

Attenuator—two floating devices connected by a pivot point that is parallel to the waves and bends due to passing waves.

Oscillating Water Column—a partially submerged chamber that focuses the wave energy when the wave enters the open end and forces air out of a smaller opening.

Oscillating Wave Surge Converter—a substantially vertical surface is mounted to an arm that is attached to a pivot on the sea bottom which moves back and forth due to passing waves.

Overtopping Device—a perimeter raised above the water surface allows waves to wash over the perimeter, thus raising the confined water level; energy is recovered when water is returned to the normal sea level.

Point Absorber—a float that rides up and down a vertical column due to passing waves.

Submerged Pressure Differential—the alternating pressures due to the rising and falling wave height are used to drive a mechanism.

Rotating Mass—the rising and falling waves are used to cause an eccentric weight to rotate about an axis.

An example of the prior art in this field is found in U.S. Pat. No. 1,960,622 to DuPont, which describes a wave power plant having vertical panels suspended from a rod above the sea on hinge-like pivots so that passing waves apply force on each pivoting vertical panel to cause the panel to rotate about its pivot. The force applied to the panel is then supplied through rigid linkages to an electric generator. While the DuPont wave power plant does transfer wave kinetic energy from the wave through the mechanism to a generator, it requires a considerable amount of beach-front equipment and support structure.

Other examples of the prior art are found in U.S. Pat. Nos. 4,170,738 and 4,371,788 to Smith, which describe a similar vertical panel or sail device in which the panels move back and forth, guided by a pair of rails on the sea bottom. It should be noted that Smith's vertical panels remain vertical and, when moved, translate back and forth on the rails. U.S. Pat. No. 7,023,104 to Kobashikawa et al. describes a third variation on a prior art moving panel, in this case where the panel pivots about a point at the bottom. The Kobashikawa approach reduces the amount of support equipment that was required for the DuPont and the Smith systems, but the structural strength of the panel and the pivot foundation's integrity limited the power that could be produced from a single device. A more practical, economical and effective system for converting wave motion to electrical energy is needed, and is described herein.

SUMMARY

It is accordingly an object of this invention to provide an improved wave energy converter which overcomes the problems with the prior art by capturing wave kinetic energy as a force on a submerged kite-like panel and transmitting the force through flexible ropes or lines loaded in tension to a power generator.

It is also an object of this invention to provide an improved wave energy converter utilizing an energy absorbing panel or kite to capture approximately one-half of the wave potential energy as a vertical force when a buoyant volume attached to the energy absorbing panel or kite is lifted by a wave, and to transmit the force through flexible ropes or lines in tension to a power generator.

It is another object of this invention to provide an improved wave energy converter having an energy absorbing kite, and tailoring the shape of the energy absorbing kite to optimize energy efficiency by using a specially configured rigid panel, multiple rigid strips which are flexibly connected, a flexible membrane, or a kite comprising a selected combination of the three.

It is an object of this invention to provide an improved wave energy converter having an energy absorbing panel coupled to tension-force transmitting members or suspension lines, compressible rigid links, or a combination of the two and which react to the force of waves on the energy absorbing panel to generate electrical power or another form of transmissible energy. The energy capture and conversion system of the present invention is configured to efficiently harness kinetic and potential energy of ocean waves to generate power by securing a wave motion responsive member to a fixed foundation at an offshore situs and mechanically connect the member to drive an electric generator or a hydraulic pump, so that when the member responds to horizontal and vertical vectors of motion of the ocean waves to move with respect to the fixed foundation, it causes the generator or pump to produce recoverable, transmissible energy.

It is an object of this invention to provide an improved wave energy converter incorporating an energy absorbing panel or kite with controllable openings which control the force of the waves on the face of the energy absorbing panel or kite.

It is an object of this invention to provide an improved wave energy converter that can survive a storm without damage by reducing the forces applied to an energy absorbing panel or kite.

Briefly, in accordance with the present invention, a wave energy converter incorporating an energy absorbing panel or kite is located in a location where it is subjected to suitable wave motion, and for purposes of the present disclosure this will be described as a location in an ocean. Preferably, to be considered for ocean wave energy conversion, an installation site (or situs) would need to demonstrate consistent wave action throughout the course of a year. The energy converter of the present invention utilizes a method for efficiently harnessing kinetic and potential energy of ocean waves to generate power by securing a wave motion responsive member to a fixed foundation at a suitable situs so that the member is responsive to horizontal and vertical vectors of motion of ocean waves to move with respect to the fixed foundation. The method further includes connecting the membrane by way of movable cables to an electrical generator to cause the generator to produce electrical energy in response to the motion of the membrane. The wave energy member of the present invention (referred to herein as a kite) is configured to capture energy from ocean waves at a selected situs having an ocean mean waterline above an ocean bottom surface, meaning the situs has a mean depth, defined as the substantially vertical distance from the elevation level of ocean bottom or sea floor to the elevation level of the undisturbed sea surface at the situs. The present invention solves the problems associated with existing wave energy converters and provides a highly efficient, easily produced, easily installed, scalable wave energy absorbing kite which, when submerged at a situs in an ocean, produces power from a wide range of depths and wave heights.

In the preferred embodiments described herein, the present invention relies on flexible members or lines (e.g., ropes or cables), to transfer alternating forces of wave-generated orbital wave velocities impinging on the wave energy panel from the energy absorbing wave energy panel, or kite to transfer the alternating forces to a suitable power converter, such as an electrical generator or a hydraulic system. This unique arrangement is able to absorb power from the wave when the panel is travelling in multiple directions. The system of the present invention dramatically reduces the material required for the construction and installation of a wave-responsive energy converter, thereby resulting in a cost that is competitive with traditional non-renewable energy power generators.

In a preferred form of the invention, the present system includes a wave energy absorbing kite comprising a vertically oriented panel, or kite, submerged in the ocean at a selected situs, and mounted for reciprocating motion in response to wave action with an upper edge near the surface and a bottom edge which extends to a selected depth. Preferably, the kite's bottom edge is well above the sea bottom at the situs; for example, if the mean depth at the situs is fifty feet, the kite may be approximately 25 feet tall, with the kite's bottom edge at a mean depth of about 25 feet. If near shore, the kite's horizontal upper edge preferably is aligned to be substantially parallel to the shoreline. The kite has vertical side edges to which are attached to a plurality of suspension lines which extend away from the energy absorbing kite, substantially parallel to the direction of the predominant wave motion at the situs, and if near shore, substantially transverse to the shoreline. The suspension lines on the shore side of the energy absorbing kite are used to transmit ocean wave energy to a generator and are preferably routed around a pulley that is fixed to the sea bottom sufficiently far away from the energy absorbing kite so that the suspension lines are substantially horizontal. Similarly, the suspension lines on the sea side of the energy absorbing kite are routed around a pulley that is fixed to the sea bottom, and these suspension lines are also substantially horizontal.

The suspension lines from the kite are routed from each of the pulleys toward a winch drum, which is fixed to the sea bottom, between the two pulleys. The suspension lines are wrapped around the winch drum in opposite directions so that, as the kite reciprocates in response to wave motion, the first line is extended at the same time the second line is retracted and vice versa. When the forces from the orbital wave velocities produced by passing waves impinge upon the energy absorbing kite, the kite will reciprocate, or oscillate, back and forth, causing the winch drum to rotate first in one direction, and then in the opposite direction. The winch drum is preferably connected to an energy, or power converter such as a rotary generator or a hydraulic pump to produce power from the motion caused by the force of the orbital wave velocities on the energy absorbing kite and transmitted by the suspension lines. In some embodiments, the winch drum is separated into two halves which are independently connected to the power converter through one-way clutches. Sensors and controllers are configured for use with the system of the present invention to monitor the horizontal position of the energy absorbing kite and, over time, to keep the kite substantially centered. It will be understood that the power converter of the present invention, although described in most of the herein-described embodiments as an electrical generator for convenience, these embodiments may also drive other power converters such as the hydraulic pump described in this application.

Optionally, in some embodiments of the invention, flotation is incorporated into the energy absorbing kite to cause it to be positively buoyant. Further, the areas of the energy absorbing kite around the suspension line attachment points are reinforced in order to distribute the stresses. The lengths of the suspension lines are adjusted so that the energy absorbing kite remains substantially planar, substantially parallel to the waves, and perpendicular to the horizontal wave velocities. In addition, a sufficient number of suspension lines are attached to the energy absorbing kite so that the stresses on the suspension lines, and on the energy absorbing kite, do not exceed the material limits. Preferably, the suspension lines are bundled or joined together into a single line that is routed around the pulley to the winch drum. The slack in the lines is removed and the lines on both sides of the kite are preferably kept tight so that equal and opposed tensile forces are created on both sides of the kite.

The energy absorbing kite is most efficient when installed in situs locations where the water depth is between one-quarter and one-half the typical distance between the peaks of adjacent waves, or the wavelength, for the location. Under these conditions the successive waves will be aligned and substantially parallel to the shoreline. The foundations for the energy absorbing kite are preferably installed so that the energy absorbing kite will be parallel to the shoreline. When the raised portion of a wave, referred to as the peak, approaches the energy absorbing kite, the orbital velocities below the surface of the water will push the energy absorbing kite along with the wave toward the shore. When the peak passes the energy absorbing kite and the wave's trough approaches the kite, the orbital velocities will change direction and push the kite in the direction opposite to the direction of the wave travel and away from the shore. In this way the energy absorbing kite will reciprocate or oscillate back and forth as waves pass over it. The orbital velocities will cause water to be pushed against the energy absorbing kite, creating a force which is transmitted by the suspension lines, which turn the winch drum, which is attached to the generator. The winch rotates one direction when the wave peak is passing the energy absorbing kite, and it rotates the opposite direction when the wave trough passes. The generator's direction of rotation will change once during the passage of each wave. Generator power collection control circuitry is preferably configured to create uniform output power that is sent to the on-shore power grid.

The energy absorbing kite can be equipped with a surface float integrated proximate to the kite's top edge to capture potential energy from the waves. The surface float follows the profile of the wave on the surface of the ocean. That is, the wave lowers the energy absorbing kite when the wave trough passes, and the wave raises the energy absorbing kite when the top of the wave peak passes. By adding a third set of suspension lines which connect the energy absorbing kite to a third "potential energy" winch drum mounted to a generator, additional power can be produced when the surface float rises from the bottom of the wave trough to the top of the wave peak. This potential energy winch drum is preferably configured with tensioners to maintain a substantially constant tension in the third suspension lines and eliminate the slack in the lines when the surface float goes from the wave peak to the wave trough. With this approach, the energy absorbing kite will absorb substantially all of the recoverable kinetic energy of the wave, plus about one-half of the recoverable potential energy of the wave.

The energy absorbing kite is configured to prevent damage during a storm by providing a control mechanism to limit the forces applied by larger than normal waves. As described previously, the orbital velocities are the strongest at the surface and decay to near zero at a depth equal to one-half of the wavelength. Thus, the third suspension lines can be retracted to lower the energy absorbing kite to the sea bottom to protect it. In this lower position the energy absorbing kite is subjected to orbital velocities with less energy, thereby reducing the forces impinging on it. As an example, if the water depth was one-half the wavelength, the height of the energy absorbing kite was one-quarter the wavelength, and the energy absorbing kite was lowered to the sea bottom, the energy applied to the energy absorbing kite by the waves would be approximately one-third of the force that would have been applied in the typical position just below the water surface.

While the force applied to the energy absorbing kite is significantly reduced by lowering the kite into regions of slower orbital velocities, the present invention, in another embodiment, provides the ability to reduce the applied forces even further. In this embodiment, the kite panel is vertically collapsible, with internal suspension lines which connect the top and bottom of the kite being provided. The area of the energy absorbing kite then can be reduced by shortening the internal lines so that the energy absorbing kite is compressed in the vertical dimension. This also permits lowering the entire kite further from the ocean surface. By combining these features, the forces applied to the energy absorbing kite during a storm can be reduced so that the kite is not damaged and the generator is not overloaded.

DESCRIPTION OF THE FIGURES

The present invention will be further understood by those skilled in the art from the following detailed descriptions of preferred embodiments thereof, taken with references to the following figures, in which:

FIG. 13C illustrates a perspective view of a wave energy kite with inflatable suspension lines, in accordance with a ninth embodiment of the present invention.

FIG. 13D illustrates an enlarged view of the cross section through the inflatable suspension line of FIG. 13C.

FIG. 13E illustrates an enlarged view of the cross section through the winch drum of FIG. 13C.

DETAILED DESCRIPTION

Turning now to a more detailed description of the present invention as illustrated in FIGS. 1-16B, it is first noted that the surface of a single wave can be broadly described mathematically as a sinusoidal motion. However, it can be observed from the motion of the water that there are both vertical and horizontal vector components of velocity in a wave. The vertical component of velocity causes the wave to rise above and to fall below a mean waterline, while the horizontal component of wave velocity causes the wave crest to move in the direction of the wave propagation. It is less obvious that there is also a horizontal component of velocity opposite to the direction of wave propagation. These velocities are depicted in FIG. 1 at four points, A, B, C and D, along a sinusoidal wave 50 having a direction of propagation 52, where the velocities are either horizontal or vertical, as indicated by vector arrows 54, 56, 58 and 60 at the respective points.

Figure 1A:
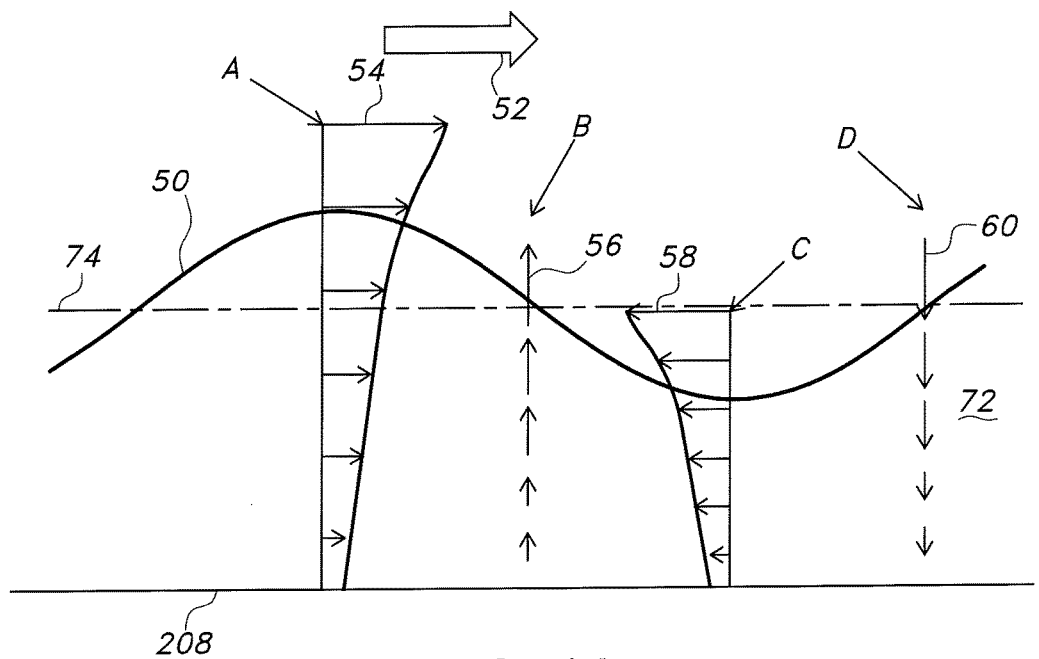
FIG. 1A and FIG. 1B are diagrams representing a vertical cross section of a body of water, such as an area within an ocean, showing the ocean's surface and waves and illustrating known relationships among sub-surface orbital velocity, wave position, and water depth.
Figure 1B:
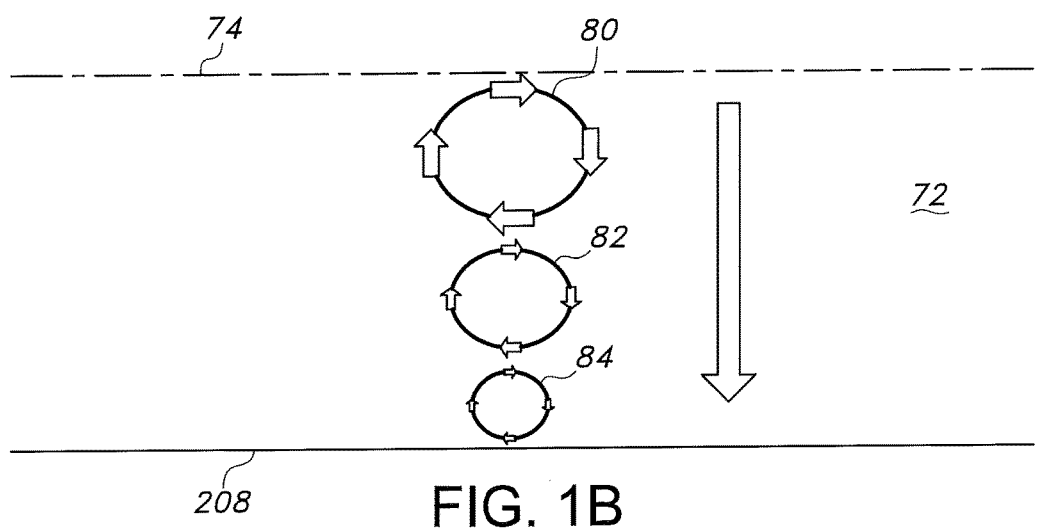

In FIG. 1A the magnitude of the wave velocity at various depths is represented by the length of the vector arrows. At the point of maximum wave amplitude, referred to as the wave peak, indicated as Point A, the velocity vectors are horizontal in the direction of the wave propagation, as indicated by arrows 54. Moving forward from the wave peak A to the point where the wave 50 passes through the mean water line level 74 at point B, the velocity vectors change to a vertically upward direction, indicated by arrows 56. At the point of minimum wave amplitude, referred to as the wave trough, indicated as Point C, the velocity vectors are horizontal in the direction opposite to the wave propagation, as indicated by arrows 58. As the wave 50 returns to the mean water line, the velocity vectors change to vertically downward, indicated by arrows 60 at Point D. The combination of these velocity vectors creates circular velocity vectors such as orbital flows 80, 82 and 84 (at different depths), and these may be referred to as the orbital velocity of the wave, as shown in FIG. 1B.

In deep water, the energy of the wave is split between potential energy, incorporated in the rise and fall of the water surface as indicated by the sinusoidal waveform 50, and kinetic energy, which is the motion of the water 72 parallel to the direction 52 of wave propagation. The orbital velocity 80 is strongest at the surface and decays with depth, as indicated by the vector arrows 54, 56, 58 and 60 and the diagrams 82 and 84, reaching zero at a depth of approximately one-half the wavelength, as indicated. In shallow water, where the water depth is less than one-half the wave length, the orbital velocities extend down to the sea bottom. As the water depth becomes shallower than one-half of the wave length, the orbital velocity paths are compressed in the vertical direction, which flattens the path into an oval.

Referring now to FIGS. 2-16B, where like characters designate like or corresponding parts elements or components throughout the several views, in the following description specific details are given to provide a thorough understanding of the various aspects of the present invention. Various features and advantages of the present invention are described below with reference to several preferred embodiments and variations thereof. However, it will be understood by one of ordinary skill in the art that alternative embodiments of the structures and methods illustrated herein may be employed without departing from the scope and principles of the described invention.

Figure 2:
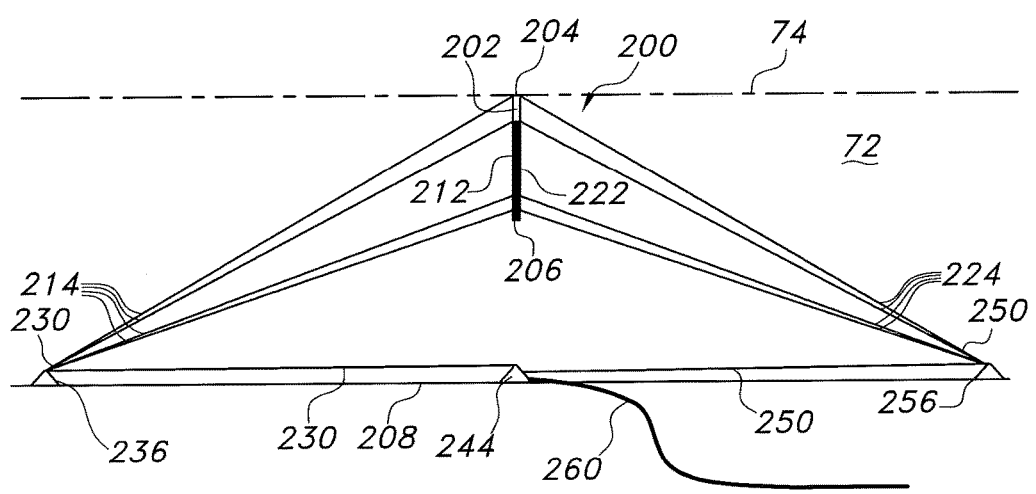
FIG. 2 illustrates a side view of a wave energy kite connected to an energy converter assembly, in accordance with a preferred form of the present invention.

FIGS. 2 and 3A-3C illustrate an ocean wave energy converting kite system 200 in accordance with a first embodiment of the present invention. In the illustrated embodiment, a wave energy absorbing kite member 202 comprises a vertically oriented panel submerged in the ocean 72 at a desired situs, with an upper edge 204 located near the surface of the water (here illustrated as being at or near the mean water line 74) and a bottom edge 206 which extends vertically downwardly to a selected depth at the selected situs. If near shore, the horizontal upper edge 204 of the kite member or panel 202 is aligned to be substantially parallel to the shoreline (not shown). In the embodiment illustrated in FIG. 2, for an installation near shore, with a situs mean depth of fifty feet between the mean water line 74 and the ocean bottom 208, the vertical extent or height of kite member or panel 202 would preferably be about twenty five feet and its length (in the direction parallel to the shoreline) would preferably be one hundred feet. The kite member or panel 202 is generally rectangular, and is coupled at its upper and lower corners of its first or left-hand surface or side 212 to a first plurality of flexible suspension lines 214 leading to the left of the panel 202 as viewed in FIG. 2, and is coupled at its upper and lower corners of its second or right-hand surface or side 222 to a second plurality of suspension lines 224 leading to the right of the panel 202 as viewed in the FIG. 2. As illustrated in FIG. 2, first or left hand surface 212 opposes second or right hand surface 222 and first suspension lines 214 extend away from panel 202's first surface 212 in a leftward direction which opposes the direction of the second or right-hand surface's second suspension lines 224. The suspension lines 214, 222 extend away from the energy absorbing kite member or panel 202 in opposing directions substantially parallel to the direction of the predominant wave motion at the situs, and if near shore, substantially'transverse to the shoreline. Wave energy kite member or panel 202 preferably is a buoyant rigid energy absorbing panel with the first or left-hand panel surface or side 212 opposing the second panel surface or side 222.

Figure 3A:
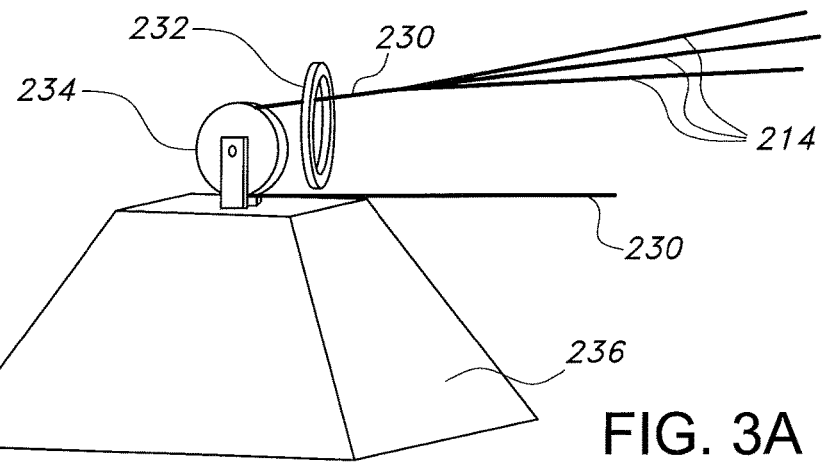
FIG. 3A illustrates an enlarged, detailed view of a first pulley assembly of the wave energy kite converter assembly of FIG. 2, in accordance with the present invention.

Optionally, panel 202 of wave energy kite system 200 may be a membrane constructed from heavy gauge rip-stop nylon with nylon reinforcing webs sewn to the membrane so that force absorbed by the kite member or panel 202 and transmitted to the suspension lines 214, 224 is uniformly distributed throughout the membrane. Optional pockets may be sewn into the reinforcing webs (not shown) to receive buoyancy chambers or floats configured to make the wave energy kite 200 slightly buoyant, so that it stays near the surface. The plurality of tension-force transmitting members or suspension lines 214 that are connected to the first or left surface or side 212 of the energy absorbing panel move with the panel as it is acted on by wave motion to transfer the force of passing ocean. The first or left surface or side suspension lines 214 are routed substantially horizontally away from the first or left surface or side 212 of the energy absorbing member or panel 202, as illustrated in FIG. 2, and the lines are joined together to form strands of a tension-force transmitting member or force transmitting line, or cable 230 that preferably passes through an optional tension-force transmitting member alignment guide or fairlead 232, as shown in FIG. 3A, before reversing direction by passing around a pulley 234 affixed to a foundation 236. As here illustrated, the foundation preferably is mounted on or secured to the ocean bed, or sea bottom, 208. The force transmitting line 230 is attached to a tension-force receiving member, such as a winch drum 238, as shown in FIG. 3C, which is coupled to and drives an electrical power generator 240.

Figure 3B:
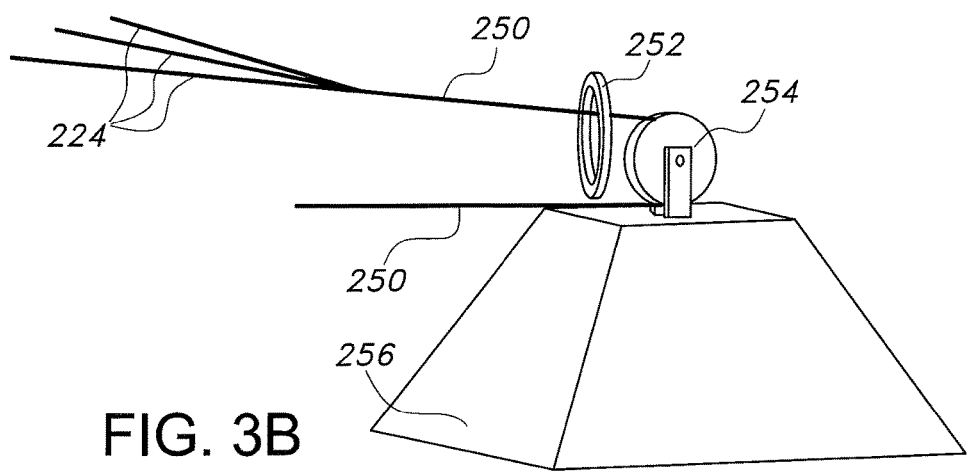
FIG. 3B illustrates an enlarged, detailed view of a second pulley assembly of the wave energy kite converter assembly of FIG. 2, in accordance with the present invention.
Figure 3C:
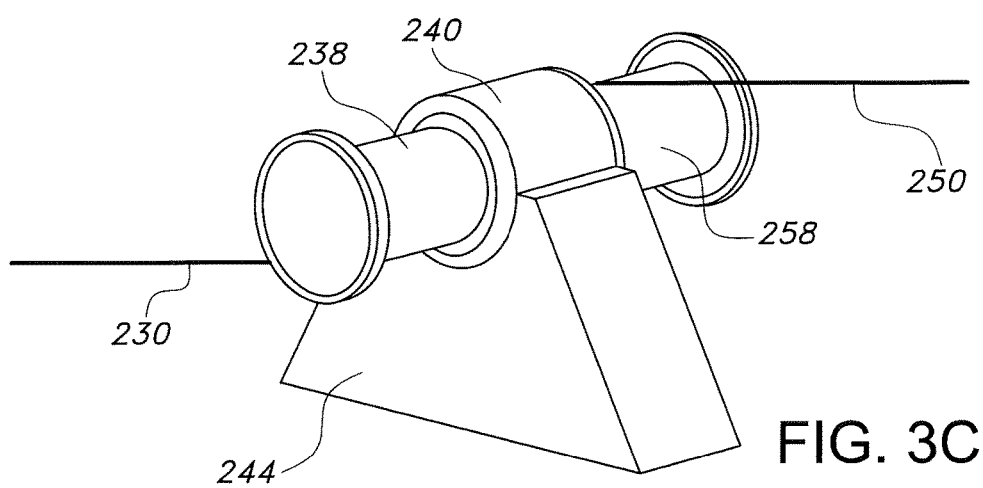
FIG. 3C illustrates an enlarged, detailed view of a double-ended bi-directional generator assembly of the wave energy kite converter assembly of FIG. 2, in accordance with the present invention.

As illustrated, the generator is supported in alignment with the pulley 234 upon a suitable foundation 244, affixed to the ocean bottom 208, as shown in FIGS. 2 and 3C, so that horizontal motion of the kite 202 is transmitted by way of cable 230 to rotary motion of the winch 238 and of the generator 240. In similar fashion, the symmetrical plurality of tension-force transmitting members or suspension lines 224 that are connected to the second side 222 of the energy absorbing panel 202, as shown in FIG. 2, move with the panel as it is acted on by wave motion transmit the force of the waves on the energy absorbing panel 202. The second side suspension lines 224 are routed substantially horizontally away from the second side 222 of the energy absorbing panel and are joined together as strands of a force transmitting line, or cable 250, as shown in FIGS. 2 and 3B, that optionally passes through a tension-force transmitting member alignment guide or fairlead 252, before reversing direction by passing around pulley 254 affixed to a foundation 256, as shown in FIG. 2 and FIG. 3B.

As here illustrated, the foundation preferably is mounted on or secured to the ocean bed, or sea bottom, 208. The force transmitting line 250 is attached to a tension-force receiving member or winch drum 258, as shown in FIG. 3C, which is also coupled to the power generator 240 secured to foundation 244, as shown in FIGS. 2 and 3C. The generator is also aligned with the pulley 254 so that horizontal motion of the kite 202 is also transmitted by way of cable 250 to produce rotary motion of the winch 258 and of the generator 240.

In operation of the system 200, the winch 258 and generator 240 receive mechanical energy from the reciprocating, or oscillating motion of kite 202 which is produced by the periodic energy of ocean wave motion. This reciprocating motion is transmitted via the tension-force transmitting members 214 and 224 to cables 230 and 250, respectively, and then to the winches 238 and 258 to drive generator 240. In response, the generator 240 generates AC or DC electrical power, which is preferably stored (e.g., in a battery, not shown) or transmitted to a local sub-station or to the electric grid via electric cable 260, as shown in FIG. 2. It should be noted that the power generator 240 is shown as a rotary device. This is merely an example of a generator that can be coupled to the linear motion produced by the wave energy kite. In some implementations, it may be advantageous to generate power or a form of transmissible energy from a device that principally moves in a linear motion.

As illustrated in FIGS. 1B and 2, in response to passing ocean waves at a selected installation situs, the wave energy kite 202 reciprocates, moving left to right and then right to left in a substantially horizontal motion in response to the energy, i.e. the orbital velocity, of a passing wave. Unrestrained, the wave energy kite would approach the velocity of the maximum horizontal component of the wave orbital velocity. The cables connecting the kite to the fixed generator restrict the distance that the wave energy kite will travel for a given wave to the diameter of the wave orbital velocity from its rest position. That is, the wave energy kite will move approximately the diameter of the wave orbital velocity in one direction, will come to a stop, then will travel approximately the diameter of the wave orbital velocity in the opposite direction, and finally return back to where it started, for each wave.

Figure 4:
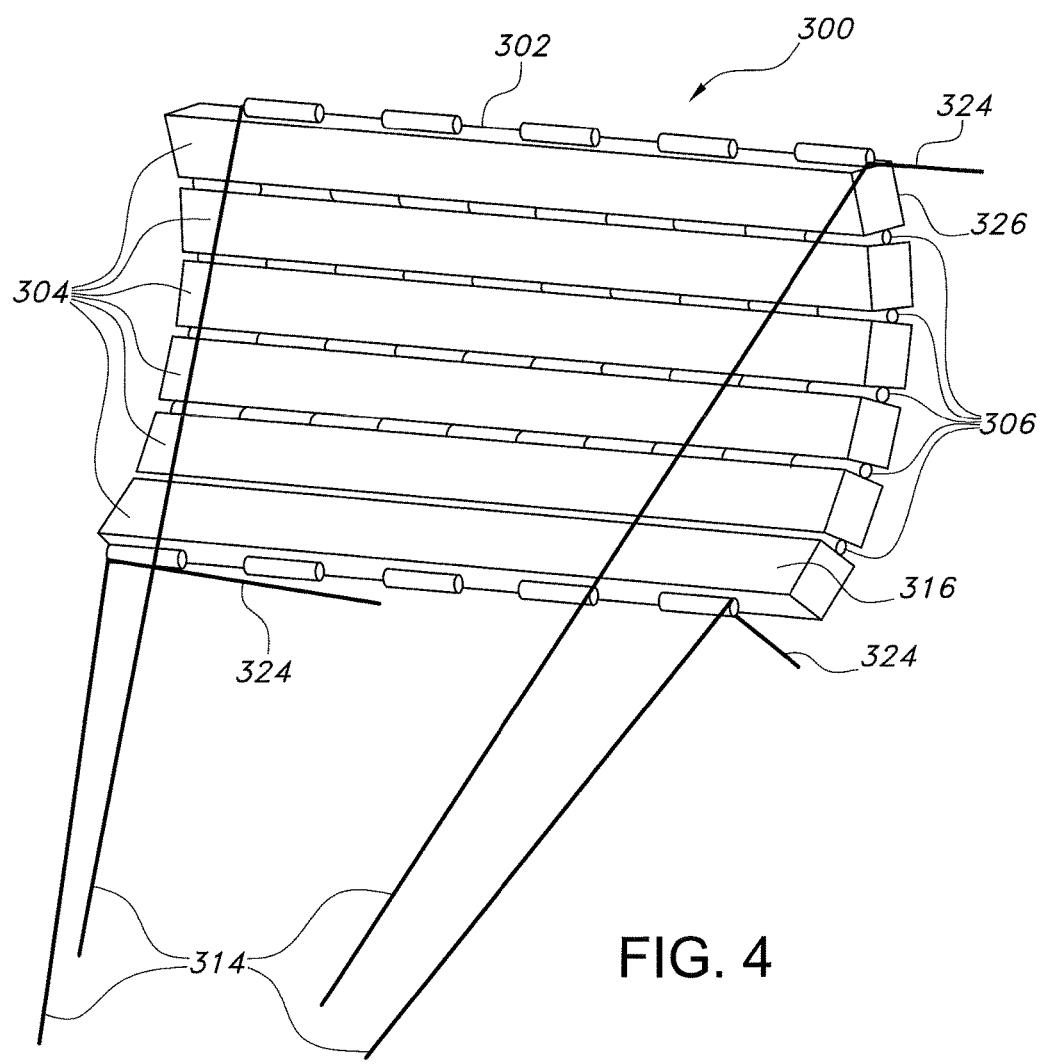
FIG. 4 illustrates an isometric, or perspective view of a wave energy absorbing panel assembly with segmented energy absorbing panel members, in accordance with a second embodiment of the present invention.

A second embodiment of the energy absorbing system is generally illustrated as 300 in FIG. 4. In this embodiment, instead of a solid panel, an energy absorbing panel 302 includes an assembly of smaller buoyant rigid panels 304 linked edge to edge to each other by joints 306, which permit the smaller panels 304 to pivot relative to each other to provide a flexible kite. The relative motion of the multiple panels at joints 306 allows the shape of the wave energy kite to be adjusted to environmental conditions to maximize the amount of wave energy captured. A sufficient number of suspension lines 314 are connected to extend from a first side 316 of the energy absorbing kite 302 to transmit the force of the waves on the energy absorbing kite. As described with respect to the embodiment of FIG. 2. the first side suspension lines 314 are then routed substantially horizontally away from the first side 316 of the energy absorbing kite 302. Similarly, a sufficient number of suspension lines 324 are connected to extend away from a second side 326 of the energy absorbing kite 302 to transmit the force of the waves on the energy absorbing kite. The second side suspension lines 324 are then routed substantially horizontally away from the second side of the energy absorbing kite, again as described with respect to the embodiment of FIG. 2, and the suspensions lines 314 and 324 are connected to the generator 240 in the same manner as described for the wave energy kite in FIGS. 2 and 3C. As the impinging wave motion causes the kite 302 to reciprocate to apply tension alternately to lines 314 and 324, the kite panels 304 will pivot with respect to each other at the joints 306 to allow the kite to flex and change shape as it moves with respect to the fixed generator.

Although just four lines are illustrated as being connected to each side of the kite, in this case at or near the four corners of the rectangular structure, it will be understood that any suitable number of lines may be connected at various points on the kite. The illustrated lines 314 and 324 at the corners allow maximum flexibility of the kite, while additional lines not only distribute the forces on the kite and reduce the tension on any one line, but also limit and control the flexing of the kite.

Figures 5A, 5B:
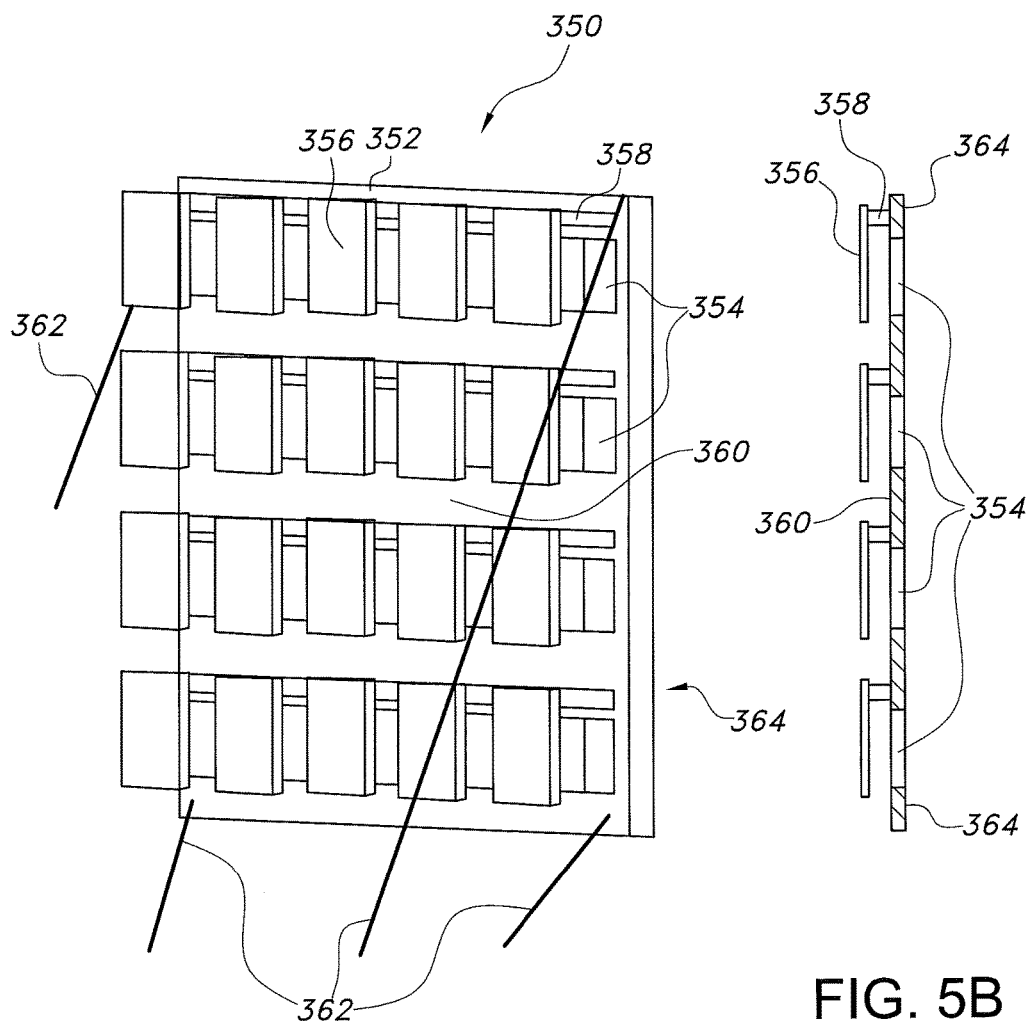
FIG. 5A and FIG. 5B illustrate an isometric, or perspective, view and a cross section view, respectively, of a wave energy absorbing panel assembly with controllable panel openings, in accordance with a third embodiment of the present invention.

In another embodiment, illustrated as 350 in FIGS. 5A and 5B, an energy absorbing panel 352, which may be similar to the panel 202 of the kite assembly 200 illustrated in FIG. 2, incorporates one or more controllable openings 354 which, in the illustration, are evenly spaced in rows across the width of energy absorbing panel 352. The controllable openings are each sealable with a corresponding hinged or flexible cover member 356, with the covers being mounted on the panel 352 by rods 358 which extend across panel 352, with the covers aligned with their corresponding openings. When an ocean wave pushes against a first side 360 of the energy absorbing panel 352, and against the covers mounted on that side of the panel, the orbital velocity of the wave will press the covers 356 against the side 360 and substantially close and seal their respective openings 354 to prevent water from flowing through the openings. The covers ensure that the total force of the waves on the first side of the energy absorbing panel 352 is the same as it would have been without the controllable openings 354. This force is then transmitted via lines 362 to a fixed generator, as previously described.

When the wave motion pushes against energy absorbing member or panel 352 on its second side 364, as illustrated in FIG. 5B, the orbital velocity of the wave will push the covers 356 away from the first side 360 of the panel 352, which will permit water to flow through the openings 354 from the second side 364 to the first side 360. The total force on the energy absorbing member or panel 352 in this embodiment is reduced by an amount that is approximated by the ratio defined by the sum of the area of the openings 354 divided by the total area of the energy absorbing panel 352. In this manner it is possible to optimize the reaction of the wave energy absorbing member or panel 352 for cases when the orbital velocities are not the same when moving toward the shore as they are when moving away from the shore.

Figure 6:
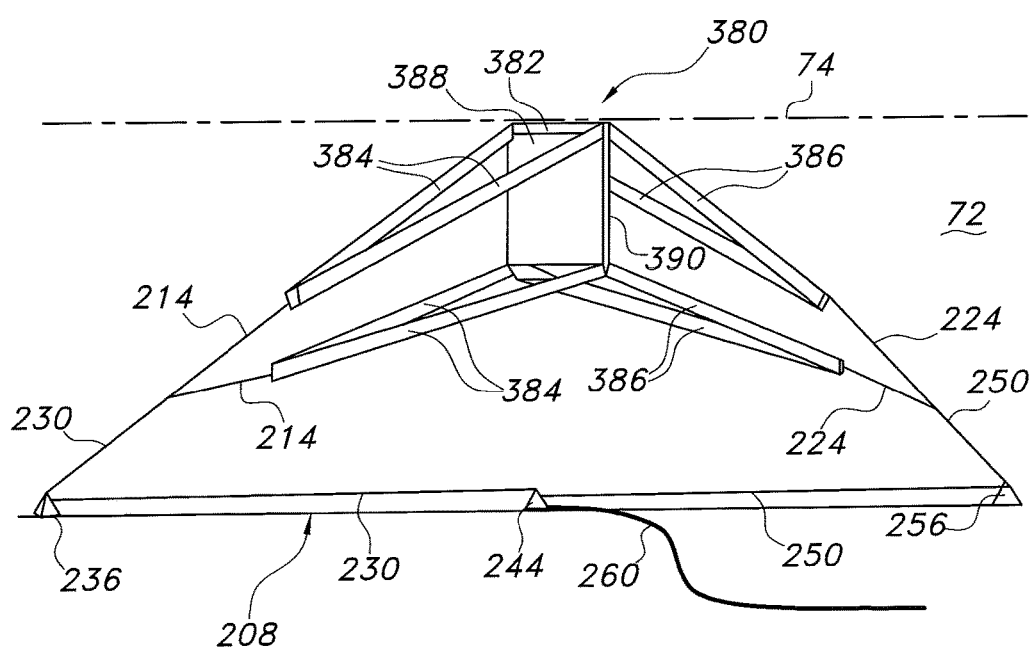
FIG. 6 illustrates an isometric, or perspective view of a wave energy kite with rigid links connected to an energy converter assembly, in accordance with a fourth embodiment of the present invention.

In another embodiment of the present invention, illustrated in FIG. 6, a wave energy kite system 380 incorporates an energy absorbing kite member or panel 382 which is generally similar to the kite member or panel 202 of FIG. 2, but incorporates rigid links 384 and 386 which respectively replace portions of the suspension lines 214 and 224 connected to opposite sides of the energy absorbing panel 202 in the previous embodiment. The first side rigid links 384 are connected to the first side 388 of the energy absorbing panel 382, while the second side rigid links 386 are connected to the second side 390 of the energy absorbing panel 382. The first side rigid links 384 are routed substantially horizontally away from the first side of the energy absorbing member or panel 382 and are connected to suspension lines 214, which are then joined into force transmitting cable 230. Similarly, the second side rigid links 386 which are connected to the second side 390 of the energy absorbing panel 382 are routed substantially horizontally away from the second side of the energy absorbing panel and are connected to suspension lines 224, which are joined into force transmitting cable 250. The force transmitting lines 230 and 250 are connected to a fixed generator in the same manner as described for the wave energy kite in FIGS. 2 and 3C, with common elements being similarly numbered.

Figure 7:
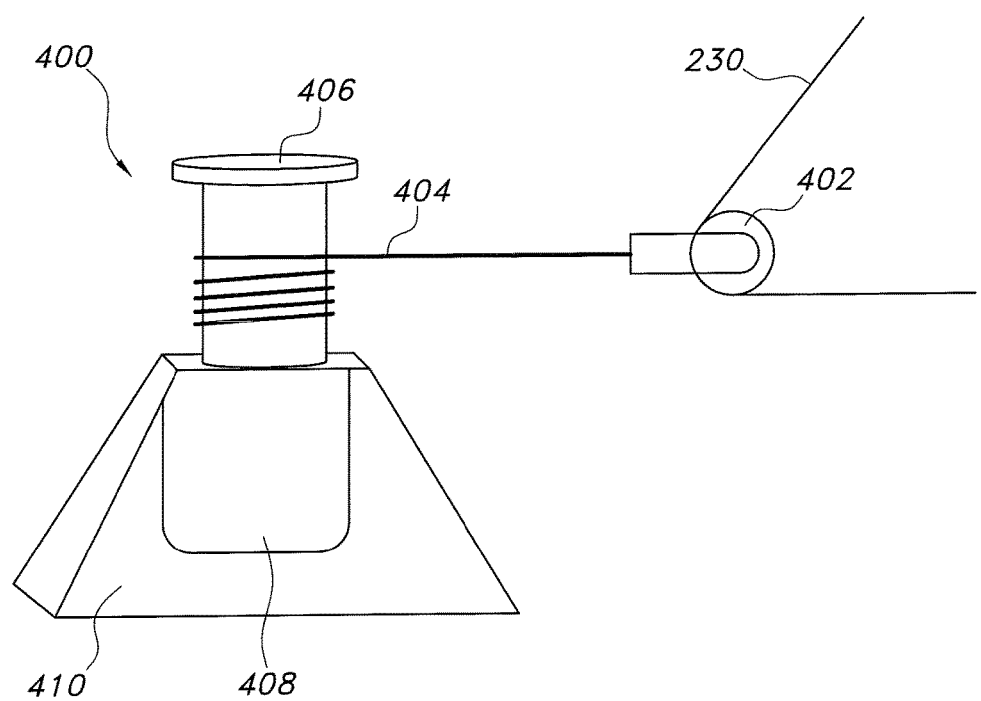
FIG. 7 illustrates a tension controller for the suspension lines of a wave energy kite, in accordance with the present invention.

The tension in the force transmitting lines or cables, such as cables 230 or 250 described, for example, in connection with the first embodiment of the invention illustrated in FIGS. 2 and 3A-C, can be made adjustable, as illustrated in the embodiment of FIG. 7. To accomplish this, the pulley 234 and foundation 236 of the first embodiment are replaced by the adjustment mechanism 400 of FIG. 7, wherein the force transmitting cable 230 passes around a pulley 402 to reverse its direction. Pulley 402 is not directly attached to a foundation; instead it is attached to a capstan line 404, which, in turn, is connected to a capstan 406 which is driven by capstan drive motor 408 that is mounted on a fixed foundation 410. It can be seen that capstan line 404 can be shortened by winding the line onto the capstan 406, and that shortening capstan line 404 will lengthen the path of force transmitting line 230 to increase the tension in line 230. Similarly, capstan line 404 can be lengthened by rotating capstan 406 in the opposite direction. Lengthening capstan line 404 will shorten the path of force transmitting line 230, which will decrease the tension in that line. Adjusting this tension will vary the motion of the kite system and thus will vary the generator output in response to the orbital velocity of the impinging waves.

Figure 8A:
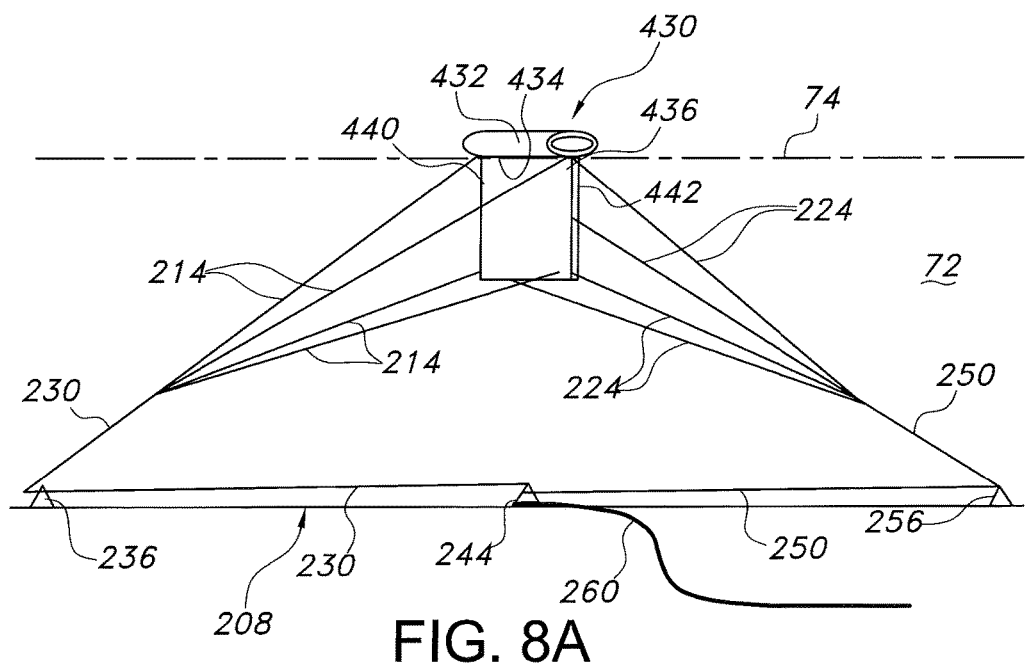
FIG. 8A illustrates an isometric, or perspective, view of a wave energy kite with adjustable buoyancy, connected to an energy converter assembly in accordance with a fifth embodiment of the present invention.
Figure 8B:
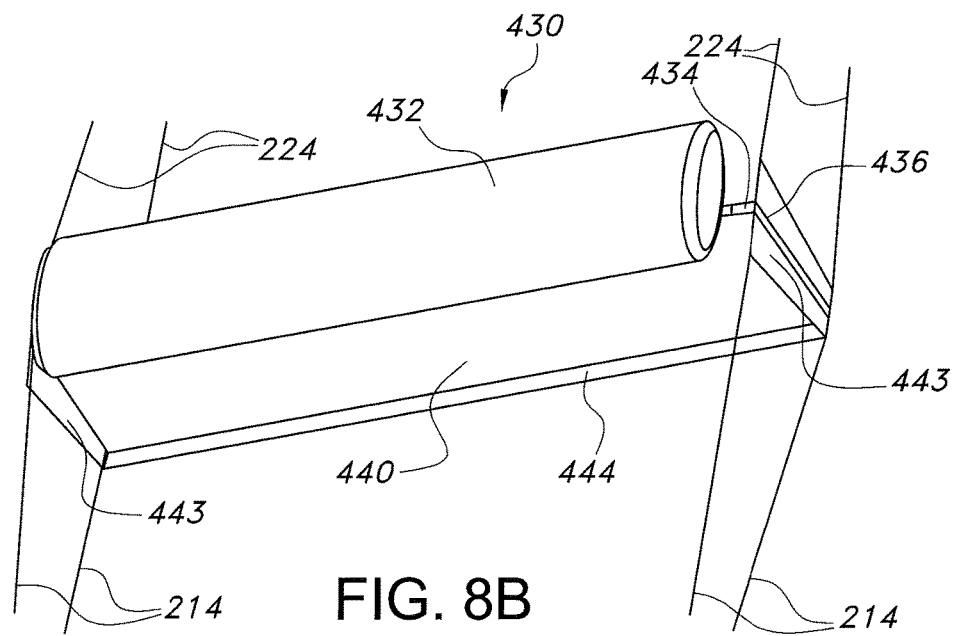
FIG. 8B illustrates an enlarged top perspective view of the buoyancy element of the wave energy kite of FIG. 8A.

Illustrated in FIGS. 8A and 8B is another embodiment of the wave energy system of the present invention, wherein a kite system 430 incorporates a variable buoyancy chamber 432 attached to the top edge 434 of an energy absorbing panel 436. In this Figure, elements common to the system of FIG. 2 are similarly numbered. The variable buoyancy chamber 432 may be connected to a controllable air source that allows the air pressure within the chamber to be varied as needed to set the desired buoyancy of the system. This embodiment makes it possible to use an energy absorbing panel 436 that is not itself buoyant to enable it to be properly positioned vertically in the water 72, for example, extending downwardly from the mean water line 74. The buoyancy of the chamber can also be varied to control the tension in the suspension lines 214 and 224 secured to the opposed surfaces 440 and 442 of panel 436, and in the force transmitting cables 230 and 250, by raising or lowering the panel 436. The force transmitting cables are connected to the generator 240 in the same manner as described for the wave energy kite in FIG. 2 and FIGS. 3A-C.

The efficiency of the wave energy kite system 430, defined as the amount of energy recovered from the wave divided by the energy contained in the wave, can be increased by reducing the flow of water around the edges of the panel 436. Side skirts 443 and bottom skirt 444 may be added to the wave energy panel 436, as illustrated for the surface 440 in FIG. 8B. It should be noted that the skirts are effective on all of the edges, on both surfaces of the wave energy panel. The side skirts 443 are substantially perpendicular to the surfaces of the wave energy panel, and the length of the skirts is adjusted to the water velocity that would be expected in that area of the panel. Therefore, the side skirts 443 are shown as being triangular in shape along the vertical edges of the wave energy panel 436, larger at the top where the water velocities are the greatest and gradually becoming smaller toward the bottom of the panel. The side skirts are attached to the suspension lines 214 and 224 to provide lateral support.

Figure 9A:
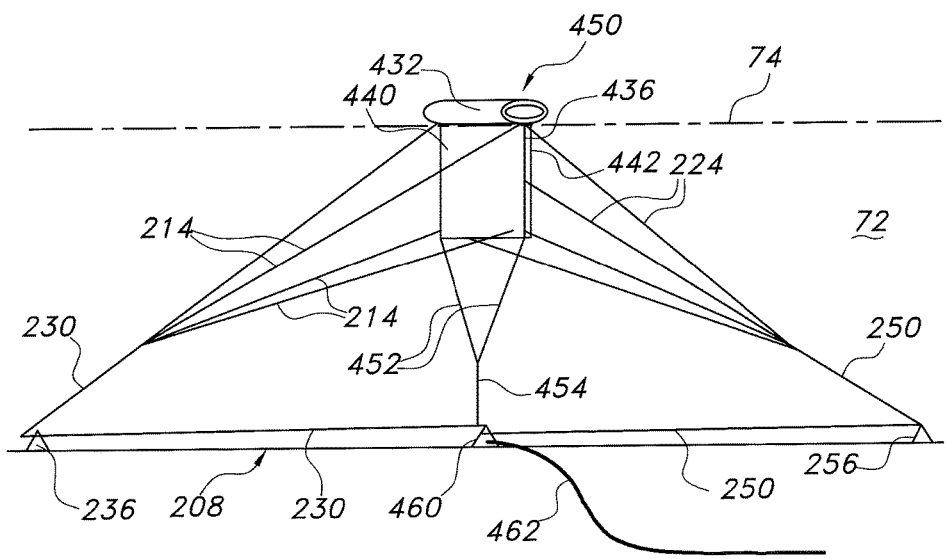
FIG. 9A illustrates an isometric, or perspective view of a wave energy kite with third side suspension lines connected to an energy converter assembly, in accordance with a sixth embodiment of the present invention.
Figure 9B:
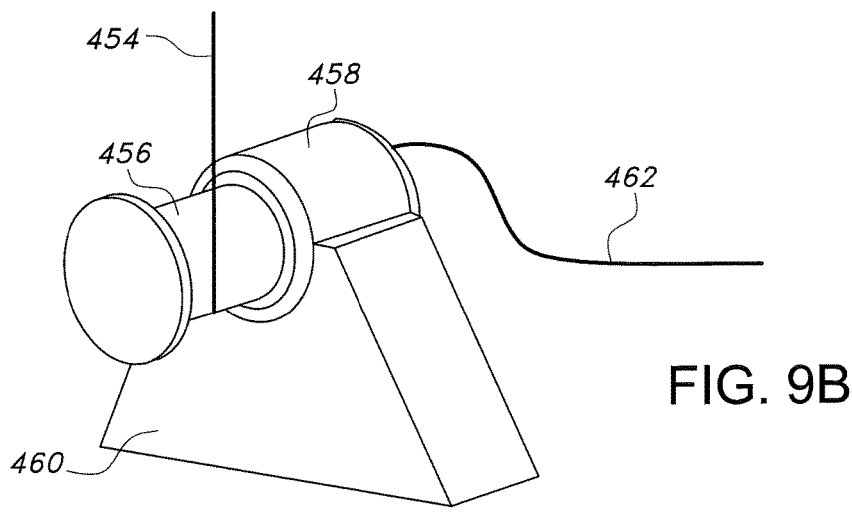
FIG. 9B illustrates an enlarged perspective view of a portion of the converter assembly of FIG. 9A.

In yet another embodiment, as illustrated in FIGS. 9A and 9B, a wave energy kite system 450 incorporates a third set of suspension lines 452 attached to the bottom of an energy absorbing panel. This third set is illustrated as being connected to a kite system such as that illustrated in FIGS. 8A and 8B, and accordingly elements common to these two embodiments are similarly numbered. The purpose of suspension lines 452 is to capture power from ocean wave potential energy and to control the depth of the energy absorbing panel 436. The suspension lines 452 are joined together with, or to form, a force transmitting line or cable 454, which is connected to a winch drum 456. The drum 456 is connected to a corresponding generator 458, and these are supported by foundation 460 as shown in FIG. 9B. This generator 458 is in addition to the generator 240 driven by cables 230 and 250. The power generated by generator 458 is transmitted to a local sub-station or to the electric grid via electric cable 462. It should be noted that the wave energy kite 450 can only produce power from generator 458 when the suspension lines 452 and force transmitting line 454 are in tension. The third suspension lines 452 will be put into an initial tension when the surface float chamber 432 is at the bottom of a wave trough, and will continue to be in tension until the surface float chamber 432 reaches the wave peak.

When the surface float 432 passes the top of the wave peak, the tension in the third suspension lines 452 is reduced, and they tend to become slack because the surface float chamber 432 is going down into the wave trough. In order to prevent the third suspension lines 452 and the force transmitting cable 454 from becoming slack, a suitable rewind mechanism, such as a spring or a drive motor, is provided to maintain a minimum tension in the suspension lines force transmitting cable. With this embodiment, the wave energy kite 450 will be capable of capturing all of the kinetic energy from the transverse motion of the wave via generator 240, plus about one-half of the potential energy from the vertical motion of the wave via generator 458.

Figure 10A:
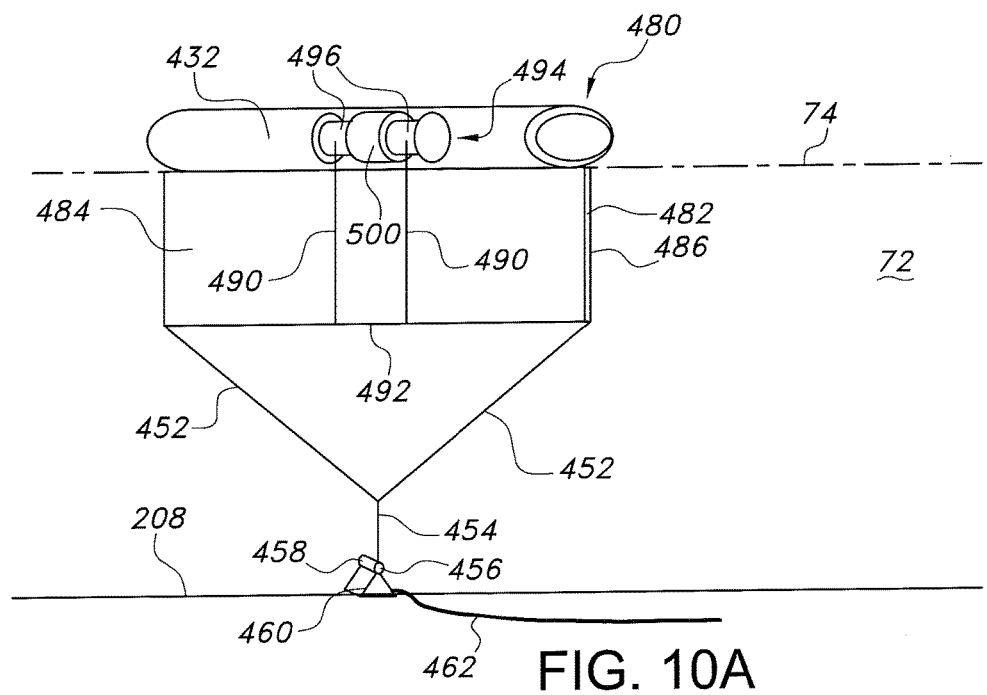
FIG. 10A and FIG. 10B illustrate perspective views of a wave energy kite with adjustable wave energy kite surface area in expanded and contracted positions, respectively, in accordance with a seventh embodiment of the present invention.
Figure 10B:
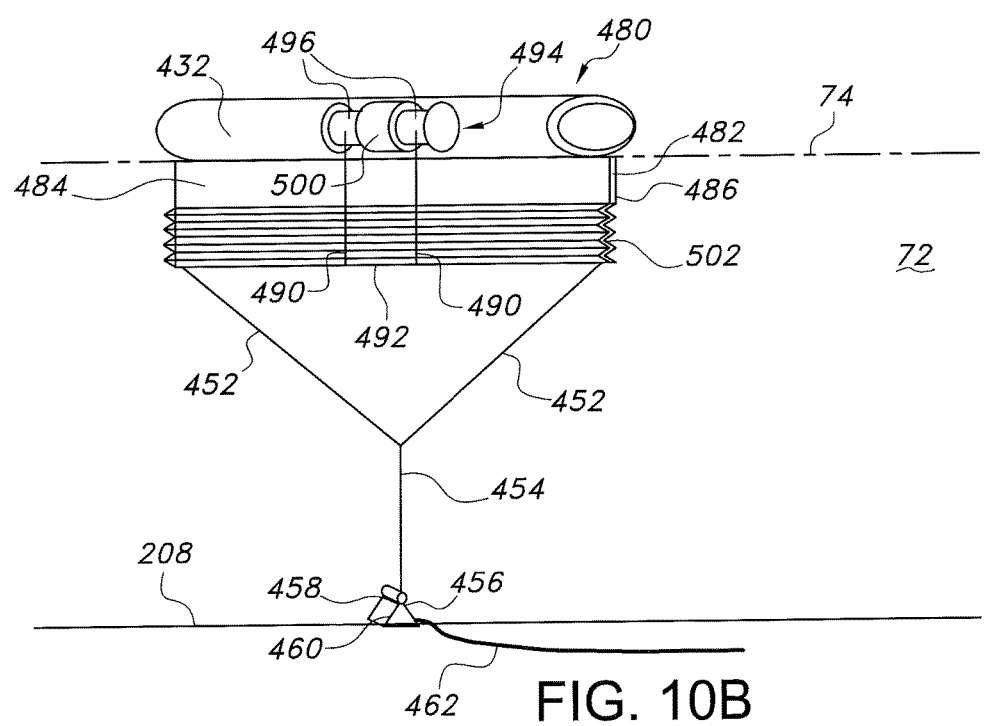
Figure 11:
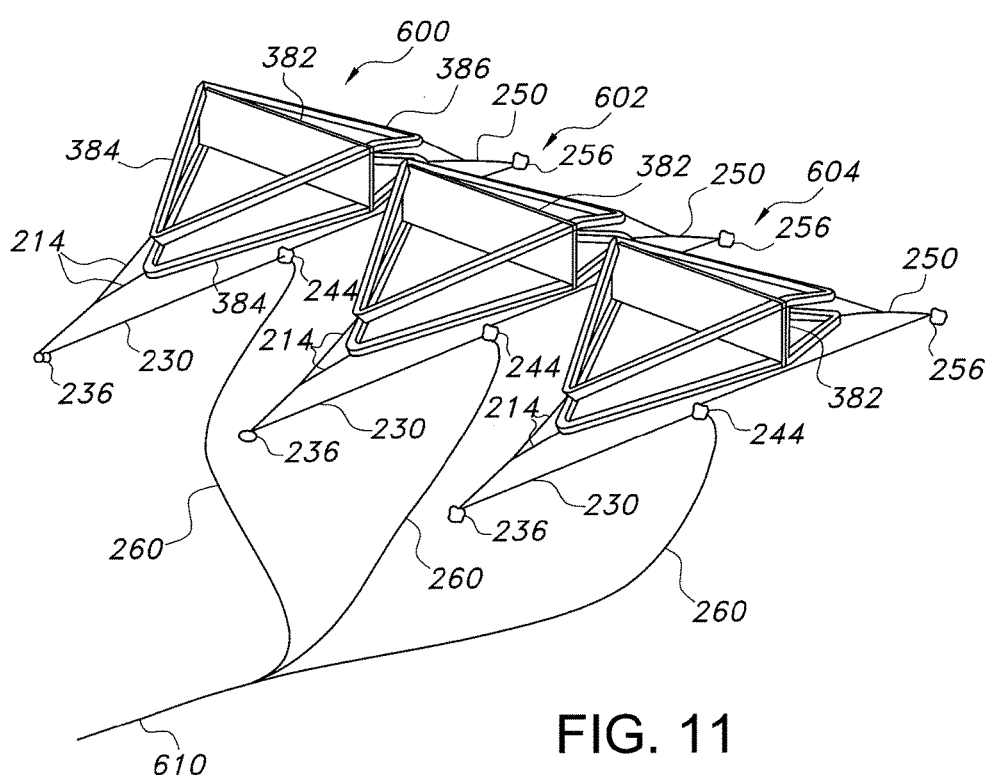
FIG. 11 illustrates a perspective view of an array of the wave energy kites and converter assemblies of FIG. 6, configured to operate independently in accordance with the present invention.

Still another embodiment of the wave energy kite of the invention is illustrated as 480 in FIGS. 10A and 10B. In this embodiment, the kite is fabricated from an energy absorbing panel 482 that consists of a flexible membrane or sail. The wave energy absorbing panel includes a first side 484 and a second side 486. As previously described, a sufficient number of horizontal suspension lines such as the lines 214 and 224 of prior embodiments (not shown in these Figures for clarity) are connected to corresponding first and second sides of the energy absorbing panel to transfer the orbital velocity of waves impinging on the energy absorbing panel 482 to a corresponding electrical power generator.

A third set of suspension lines 452 are attached to the bottom of the energy absorbing panel 482 to capture power from the wave potential energy and to control the depth of the energy absorbing panel. As described with respect to the embodiment of FIGS. 9A and 9B, the suspension lines 452 are joined together to form force transmitting cable 454 which is, in turn, connected to winch drum 456 to drive generator 458 affixed to foundation 460. The electrical power generated by the potential energy of a wave is transmitted to a local sub-station or to the electric grid via electric cable 462.

The embodiment illustrated in FIGS. 10A and 10B also incorporates a fourth set of adjustable suspension lines 490 connected from the bottom edge of the energy absorbing panel 492 upwardly to a winch set 494 having corresponding drums 496 driven by a control motor 500. Preferably, the winch set 494 is mounted inside of the buoyancy chamber 432. The fourth set of suspension lines 490 are used to adjust the vertical dimension of the flexible energy absorbing panel 482, as illustrated at the folds 502 in FIG. 10B. The vertical dimension of the energy absorbing panel 482 is shortened when the fourth set of suspension lines 490 is wound onto the winch set drums 496. Conversely, the vertical dimension of the energy absorbing panel 482 is lengthened when the fourth set of suspension lines 490 is extended from the winch set drums 496. Additional sets of these adjustable suspension lines with corresponding winch sets may be provided as needed.

The dimensions of the wave energy kite system of the invention illustrated in the above-described embodiments in a plane parallel to the impinging wave crests is limited by the forces that can be absorbed and distributed by the kite to the suspension lines. Additionally, the further the suspension lines are angled away from a center line of the impinging force, which may be a horizontal force transmitting line substantially along the mean water line, the greater will be the angle at which the wave energy is transmitted to the generator by way of the direction reversing pulleys (234 and 254 in FIGS. 3A and 3B). The greater the angle of the suspension lines with respect to the wave center line becomes, the greater will be the transverse, or horizontal, vector component of the impinging force which is parallel to the face of the wave energy kite. This transverse force tends to compress the face of the kite and does not result in a force creating power at the generator, thereby reducing the efficiency of the system. Even with a rigid panel, or stiffeners on a flexible membrane, the maximum practical angle for the suspension lines (e.g., indicated at α in FIG. 15B) is 45 degrees measured from line 853 which is normal to face 856 of the kite 852. In order to produce more power from the impinging waves, additional wave energy kites can be deployed next to each other as illustrated by kites 600, 602 and 604 in FIG. 11. For purposes of illustration, these kites are each the same as the wave energy kite 382 of FIG. 6, with common elements being similarly numbered. As illustrated, the kites may be generally aligned side-by-side and held in place by their respective suspension lines, with each of these wave energy kites operating independently to generate power. The power is combined into a single electric power cable 610 going to a sub-station at sea or on shore.

Figure 12:
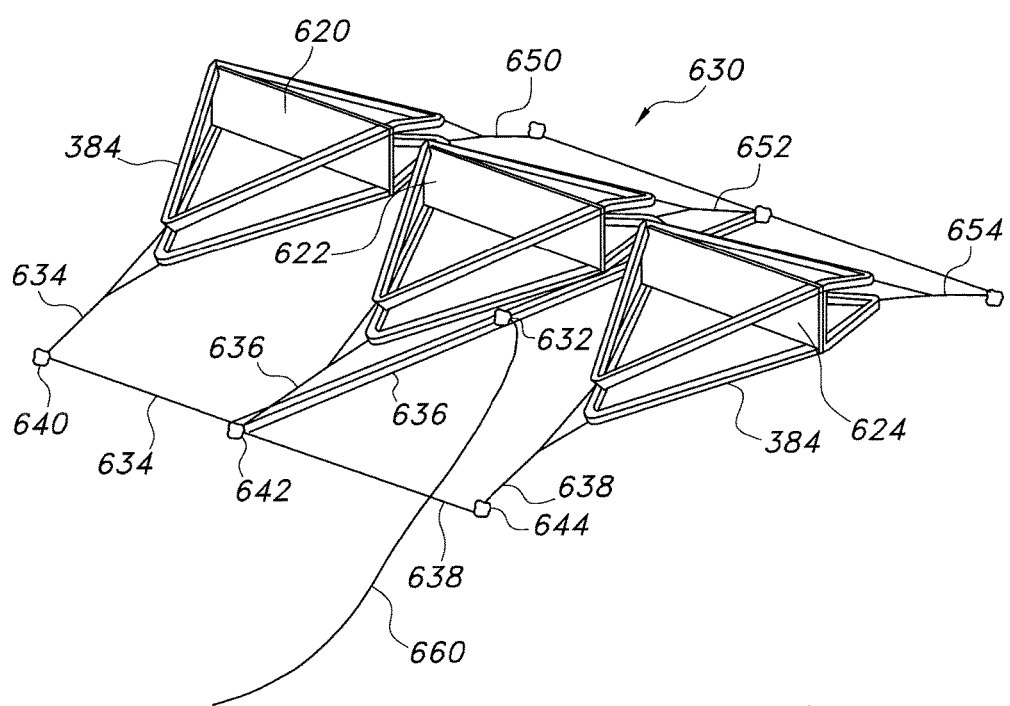
FIG. 12 illustrates a perspective view of the array of the wave energy kites of FIG. 11, configured to combine their energy for input to a single large generator, in accordance with the present invention.

Referring now to FIG. 12, the installation cost of a wave energy kite system requiring more than one kite to produce the desired power will typically be lowered if a single large generator is used, due to economy of scale. An exemplary system configuration where the forces absorbed by three wave energy kites 620, 622, and 624 (each being like the kite illustrated in FIG. 6) are combined to operate a single winch and generator set 632 located under the center wave energy kite 622, as generally illustrated as 630 in FIG. 12. Although the suspension lines and force transmitting lines for wave energy kite system 630 are substantially the same as those described in FIG. 6, the rigid links 384 that are shown connected to the individual wave energy kites are merely exemplary and are used to simplify the Figure: their use does not imply that this is the only suspension that can be used. As illustrated, the rigid links 384 of the wave energy kites 620, 622 and 624 are connected to corresponding force transmitting lines 634, 636 and 638, which are directed by corresponding pulleys mounted to foundations 640, 642 and 644. Lines 634 and 638 are directed by their respective pulleys on foundations 640 and 644 inwardly to the center wave energy kite pulley foundation 642, which includes pulleys to turn the several force transmitting lines 634, 638 and 636 toward the winch and generator set 632. As described in previous embodiments, a mirror image of the suspension lines and foundations is connected to the opposite side of the wave energy kites, with lines 650, 652 and 654 similarly driving the generator set 632. The forces absorbed by the three wave energy kites 620, 622 and 624 are transmitted to the winch drums on set 632, which drive a single generator. The power produced by the generator is distributed to the shore-based electric grid by electric cable 660.

In each of the foregoing embodiments, the wave forces tend to move the energy-absorbing kites in a reciprocating horizontal path, with suspension cables keeping the kites in proper alignment with the impinging wave forces. In another embodiment of the invention, as generally illustrated at 700 in FIGS. 13A and 13B, a kite 702 is secured to a fixed foundation by suitable suspension cables that are arranged to produce pivotal motion of the kite about an axis at the foundation. In this arrangement, the kite 702 preferably is a flexible membrane or kite, but may be a panel such as any of those described hereinabove, and is secured at its bottom edge 704 by lines 706 and a cable 708 to a winch and motor set 710 having a winch 712 and a motor 714 secured to a fixed foundation 716 (FIG. 13B) to constrain and to control the depth of the energy absorbing panel. The kite 702 may carry buoyancy chambers 720 at its top edge to hold the kite vertically upright and positioned, for example, with its top edge being held at the mean waterline 74 The chambers may be either fixed, variable, or a combination of fixed and variable buoyancy chambers, and these, together with adjustment of the length of cable 708 using motor 714 and winch 712, position the kite with respect to the mean waterline. As in previous embodiments, a front surface 730 of the kite panel 702 is connected via suspension lines 732 and cable 734 passing around a corresponding pulley on a foundation 736 to a winch-generator set (not shown). Similarly, the back surface 740 of the kite panel 702 is connected via suspension lines 742 and cable 744 passing around a corresponding pulley on a foundation 746 to the winch-generator set for driving the generator to produce output electrical power on line 750.

In this embodiment, the suspension lines 732 and 742 are connected only at the top of the panel 702 and the tension of lines 706 and 708 are adjusted to keep a constant distance between the panel and the fixed foundation 716. A proper adjustment of the tension in suspension lines 732 and 742 allows the panel 702 to move back and forth with impinging wave motion, with the panel pivoting about the axis of the winch 712 and motor 714. The energy absorbing panel can move through three positions: position A is the neutral position where the energy absorbing panel 702 is substantially vertical. Positions B and C illustrate the extent of the travel of the energy absorbing panel 702 due to the force applied to the panel by passing waves. This pivotal motion causes the suspension lines 732 and 742 to drive the power generator, as previously described.

Figure 13A:
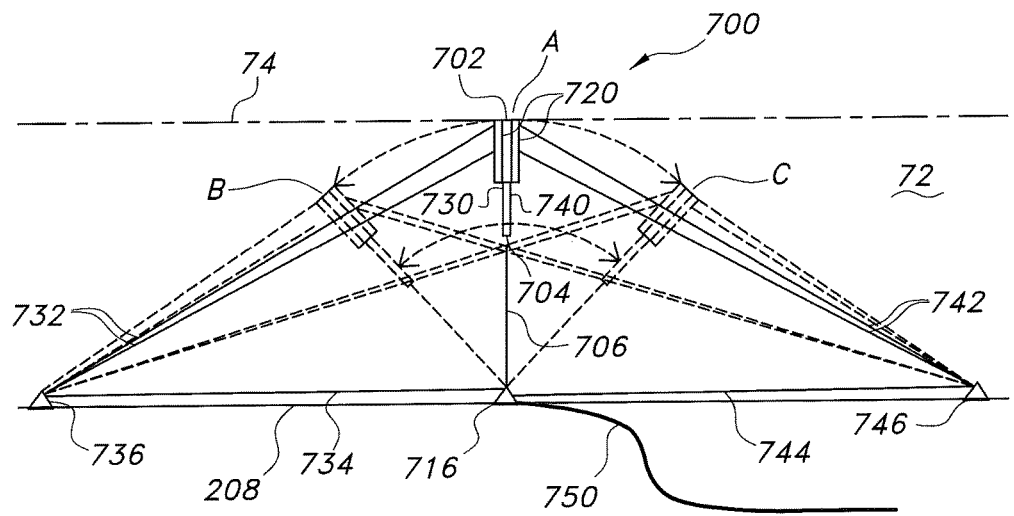
FIG. 13A illustrates a side view of a wave energy kites mounted for pivotal motion, in accordance with an eighth embodiment of the present invention.

The system illustrated in FIG. 13A is an example of how the various embodiments of the present invention can be tailored to a specific situs. For a situs where the water depth is greater than ½ of the typical wavelength, the underwater velocity is greater at the top of the energy absorbing panel 702 than it is at the bottom of the panel. As a result of the difference in water velocity, the top of the energy absorbing panel will move a greater distance than the bottom of the panel. This effect is illustrated in FIG. 13A by positions A, B and C. The suspension lines 732 and 742 (shown as dashed lines in positions B and C) attached to the top of the energy absorbing panel transmit the force absorbed from the wave, even when the energy absorbing panel is at an angle with respect to the vertical, as illustrated by position B or C. The set of suspension lines 706 provide the constraint for the lower portion of the energy absorbing panel 702.

Figure 13B:
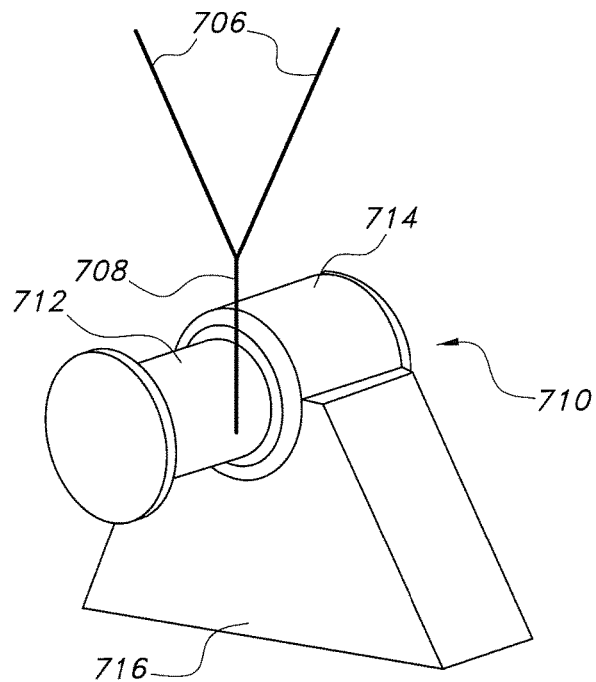
FIG. 13B illustrates an enlarged view of the converter of FIG. 13A.

The set of suspension lines 706 can also be used to adjust the vertical position A of the energy absorbing panel 702. Referring now to FIG. 13B, the depth of the energy absorbing panel 702 is increased when the suspension cable 708 connected to lines 706 is wound onto the winch drum 712 when motor 714 rotates the winch drum 712. Increasing the depth of the energy absorbing panel 702 will reduce the wave velocity to which the energy absorbing panel is subjected, thereby reducing the energy that can be absorbed. Conversely, the depth of the energy absorbing panel 702 is decreased when the set of suspension lines 706 and cable 708 are extended from the winch drum 712 under the control of motor 714. Decreasing the depth of the energy absorbing panel will increase the wave velocity to which the energy absorbing panel is subjected, thereby increasing the distance the energy absorbing panel travels and increasing the energy which can be absorbed.

In some locations, the wave velocity profile may cause the energy absorbing panel 702 portrayed in FIG. 13A to move in the horizontal plane instead of pivoting about the winch drum 712. The horizontal motion of the energy absorbing panel will lower the energy recovery efficiency of the energy absorbing kite 700. To prevent this, the energy absorbing panel 702 can be constrained to pivot about winch drum 712 by extending the vertical height of the energy absorbing panel 702 down to the winch drum, or by replacement of the suspension lines 706 and cable 708 with rigid links that extend down to the winch drum. Extending the height of energy absorbing panel, however, or replacing the suspension lines with rigid links, will degrade or eliminate the ability to lower the energy absorbing panel to reduce the wave velocities to which the wave energy kite is subjected. An alternative embodiment, illustrated in FIGS. 13C-13E, is to use inflatable suspension lines 752 in place of the suspension lines 706 and cable 708. When the inflatable suspension lines 752 are pressurized, they behave as a rigid link; however, when they are deflated, they can be wound onto the winch drum 712, permitting the energy absorbing panel 702 to be lowered when required. In practice, the inflatable suspension lines 752 would be deflated and the winch drum 712 would be rotated by motor 714 until the energy absorbing panel 702 has reached the desired height.

As illustrated in FIG. 13D, Detail A (which is a cross section through the inflatable suspension line 752), the inflatable suspension lines would be attached to, or incorporated into, the energy absorbing panel 702 to maintain its shape, and the inflatable suspension lines would be inflated by passing an fluid through an inflating tube 754, attached to the inside of the inflatable suspension lines. The inflating tube 754 passes through a rotary joint in the winch drum (FIG. 13C) so that it can be connected to the inflating fluid. When the inflatable suspension lines 752 are inflated, the shape of the inflatable suspension line still wound around the winch drum 712 will remain substantially flat. This is illustrated in FIG. 13E, Detail B, which is a cross section through winch drum 712 focused on the point where the inflatable suspension line leaves the winch drum.

Figure 14:
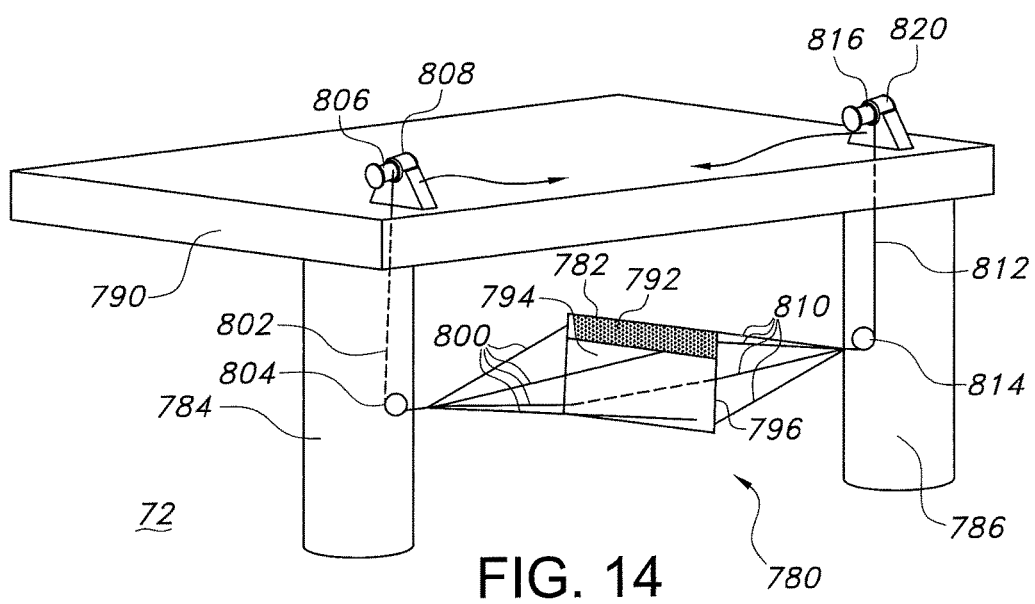
FIG. 14 illustrates a perspective view of a wave energy kites in accordance with the present invention, mounted between the support piers of a deck such as a drilling rig.

Another embodiment of the wave energy kite system of the present invention is illustrated as 780 in FIG. 14. In this embodiment, an energy absorbing panel 782 is supported from foundation piers 784 and 786 of an offshore structure 790, such as an oil drilling platform or a wind turbine. The energy absorbing panel 782 is oriented so that it is perpendicular to the prevailing wave direction of travel in the ocean 72. Similar to sea bottom mounted wave energy kites described above, the energy absorbing panel 782 is constructed from a flexible membrane or a rigid panel and includes either a fixed, a variable, or a combination, buoyancy chamber 792 and has a first side 794 and a second side 796. A sufficient number of suspension lines 800 are connected to the first side 794 of the energy absorbing panel to transfer the force of waves impinging on the energy absorbing panel 782. The suspension lines 800 are joined together with a force transmitting line 802 which passes around pulley 804 to redirect the force transmitting line 802 toward a winch 806. The line 802 is attached to the winch in such a manner as to drive a connected generator 808. Similarly, suspension lines 810 are connected to the second side 796 of the energy absorbing panel 782. These suspension lines are joined together with force transmitting line 812, which passes around pulley 814 to redirect the force transmitting line 812 toward a winch 816. This force transmitting line is attached to the winch in such a manner as to drive a connected generator 820. Power produced by generators 808 and 820 are transmitted to a sub-station for redistribution on the offshore platform.

Figure 15A:
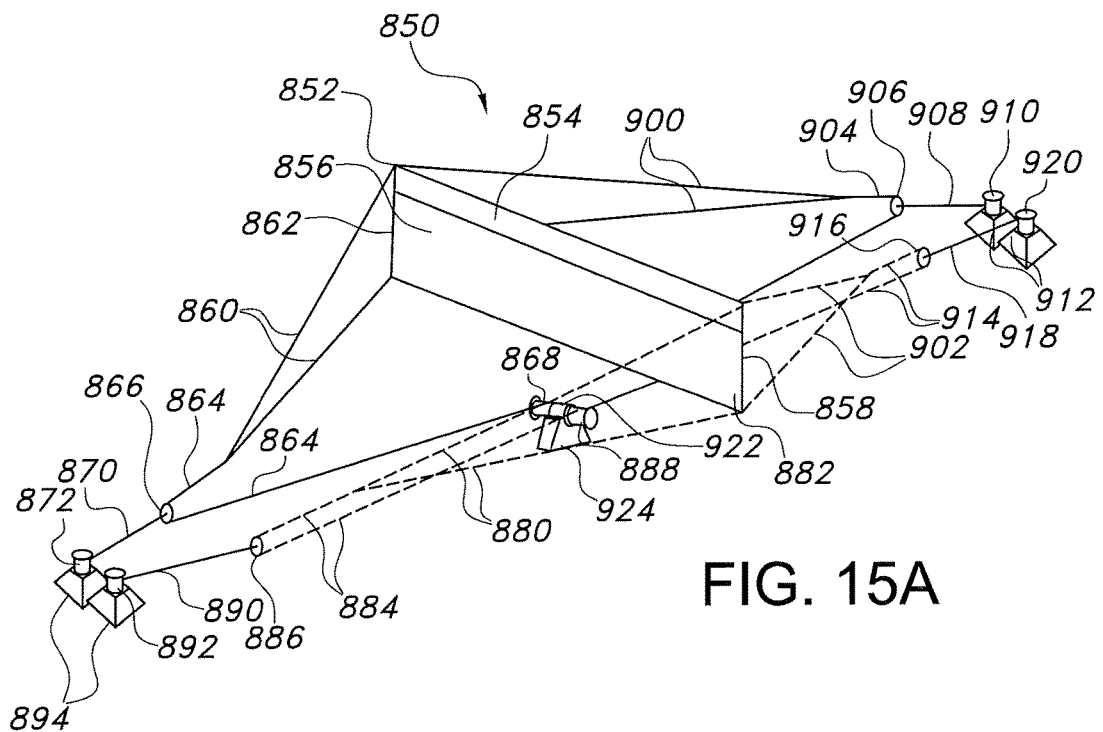
FIG. 15A illustrates a perspective view of an adjustably mounted wave energy kite and converter assembly in accordance with a tenth embodiment of the present invention.
Figure 15B:
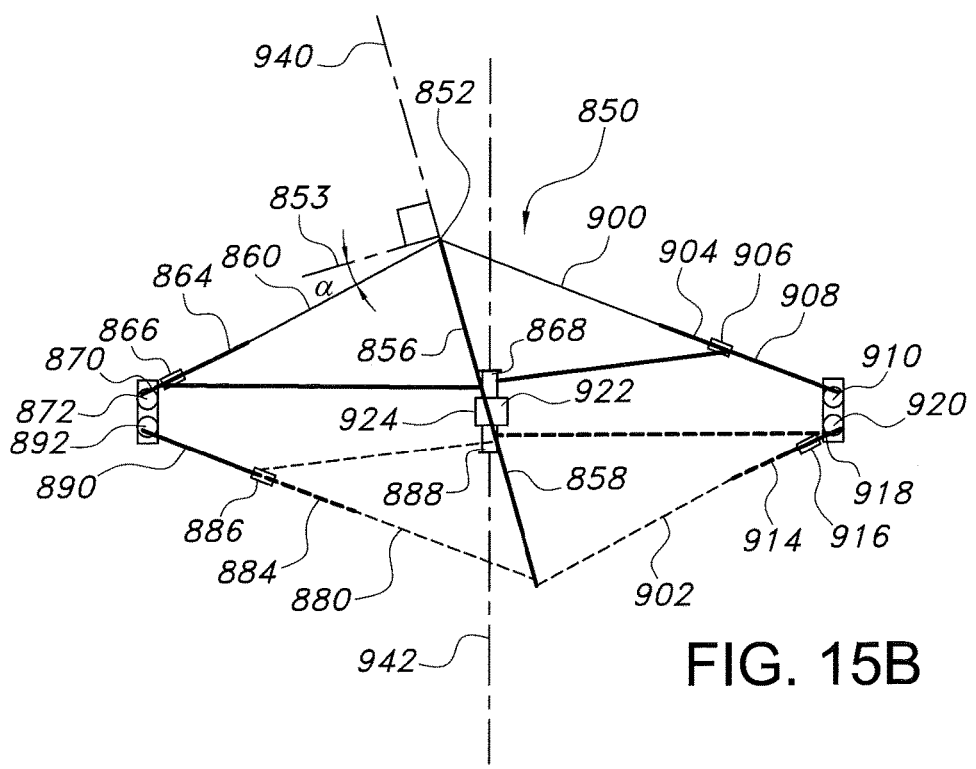
FIG. 15B is a top plan view of the kite and converter assembly of FIG. 15A.

The embodiment shown in FIGS. 13A-13E demonstrates the flexibility of the present invention to be tailored to a specific situs. In previous embodiments, it has been assumed that the direction of wave travel is perpendicular to the shoreline, and it is evident that the energy that can be extracted from the waves is maximized when a wave energy kite system, such as that illustrated as 850 in FIGS. 15A and 15B, is positioned to be perpendicular to the direction of wave travel. There are situs, however, where the direction of wave travel varies over time, due to changes in water currents, wind currents, or a combination of the two, and in such circumstances, the maximum energy can be captured from the waves by adjusting the orientation of the wave energy absorbing panel 852 so that it remains perpendicular to the direction of wave travel under changing conditions.

Accordingly, in the embodiment shown in FIGS. 15A and B, an energy absorbing kite member or panel 852, constructed of either a flexible membrane or rigid panel and including either a fixed, a variable, or a combination fixed and variable buoyancy chamber 854. Panel 852 has a first surface or side 856 and a second surface or side 858 which is illustrated in FIGS. 15A and 15B to oppose first surface or side 856. A sufficient number of suspension lines 860 are connected to one end 862 of the first surface or side 856 of the energy absorbing panel to transfer the force of impinging waves on that end of the energy absorbing panel. The suspension lines 860 are joined together with a force transmitting line 864, which passes around a pulley 866 to redirect the force transmitting line toward a first winch drum 868 as illustrated in FIGS. 15A and 15B. Pulley 866 is attached to a control line 870 which is secured to a motor-driven capstan 872. A second set of suspension lines 880, shown in dotted lines, is connected to a second end 882 of the first surface or side 856 of the energy absorbing panel to transfer the force of the waves impinging on the second end of the energy absorbing panel 852. Suspension lines 880 are joined together with force transmitting line 884, which passes around pulley 886 to redirect the force transmitting line 884 toward a second winch drum 888 as illustrated in FIGS. 15A and 15B. Pulley 886 is attached to a control line 890 which is secured to a motor-driven capstan 892. The capstans 872 and 892 are mounted on fixed foundations 894.

Similarly, the second surface or side 858 of the energy absorbing kite member or panel 852 incorporates a sufficient number of suspension lines 900 connected to the first end 862 of the panel to transfer the force of impinging waves on that corresponding end of the energy absorbing panel. A second set of suspension lines 902 are connected to the second end 882 of the second surface or side 858 of the energy absorbing panel to transfer the force of the waves on the corresponding opposite end of the energy absorbing panel. The suspension lines 900 are joined together with force transmitting line 904, which passes around pulley 906 to redirect the force transmitting line toward first winch drum 868. Pulley 906 is attached to a control line 908, which is secured to a capstan 910 mounted on a fixed foundation 912. Suspension lines 902 are joined together with force transmitting line 914, which passes around pulley 916 to redirect the force transmitting line 914 toward second winch drum 888. Pulley 916 is attached to a control line 918, which is secured to a capstan 920, mounted on the fixed foundation 912. Energy from wave motion will be absorbed by the wave energy kite 852 and transferred by the various suspension lines to the first and second winch drums 868 and 888, which in turn transfer energy to a generator 922 mounted on a fixed foundation 924.

FIG. 15B provides a top view of the wave energy kite 850 to aid in understanding how the angle of the energy absorbing kite member or panel 852 is adjusted so that the panel's opposing first and second surfaces 856, 858 remain perpendicular to the direction of wave travel. The main axis 940 of the energy absorbing panel 852 is shown as being inclined to a line 942 that is parallel to the shoreline. This is achieved by adjusting two diagonally opposed capstans 872 and 920 to reduce the length of opposed control lines 870 and 918, and, at the same time, adjusting the other two diagonally opposed capstans 892 and 910 to increase the length of lines 890 and 908. By adjusting the length of these lines, the energy absorbing panel will pivot substantially about its vertical centerline so that it remains perpendicular to the direction of wave travel.

Figure 16A:
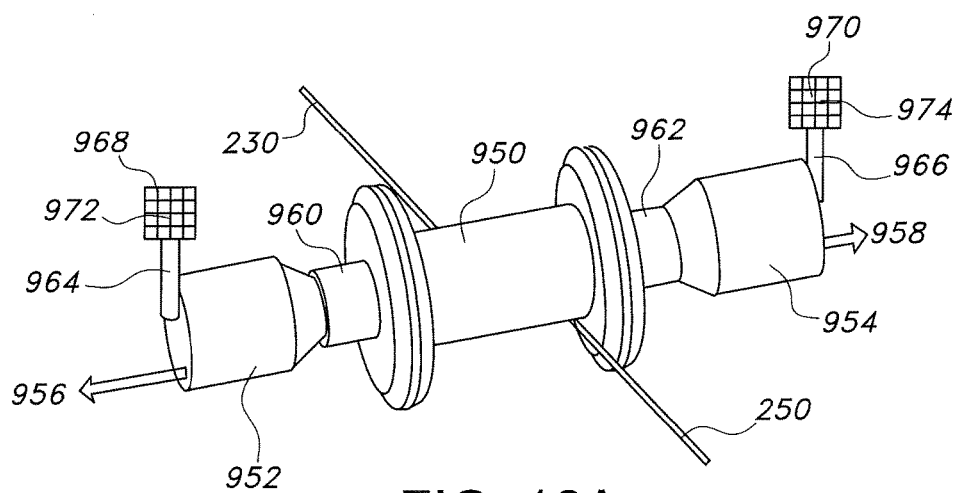
FIG. 16A illustrates a perspective views of a wave energy kite system component that generates electricity by pumping sea-water to a sea-based or a shore-based hydraulic system, in accordance with an eleventh embodiment of the present invention.
Figure 16B:
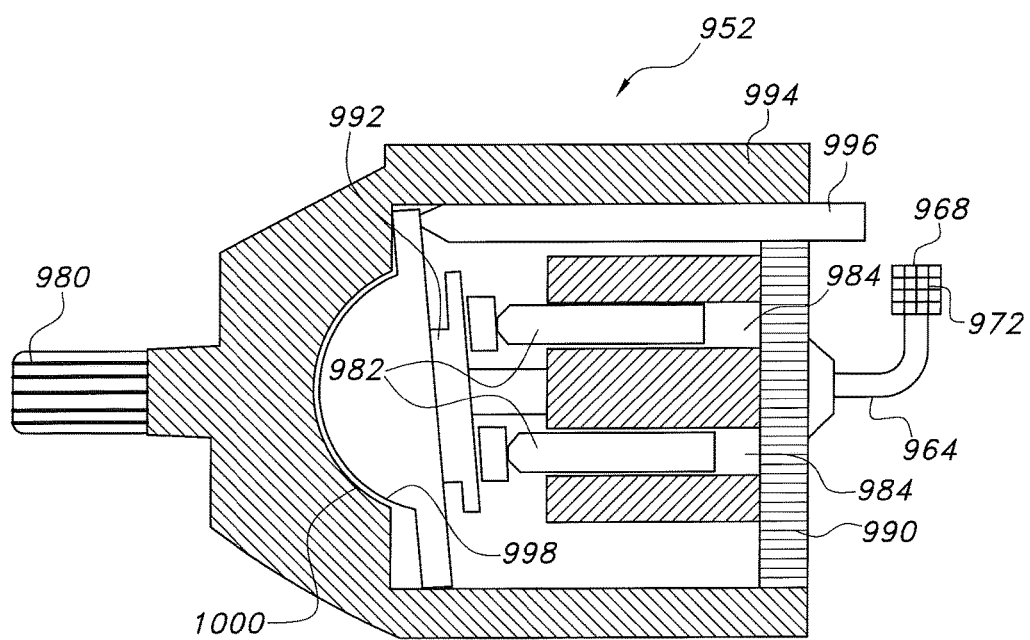
FIG. 16B is a diagram illustrating, in cross section, a wave energy kite system component that generates electricity by pumping sea-water to a sea-based or a shore-based hydraulic system, in accordance with an eleventh embodiment of the present invention.

Instead of generating electricity from the energy absorbed from the wave, an alternate embodiment is to pump sea-water to either a sea-based or a shore-based hydraulic system, as illustrated in FIGS. 16A and 16B, illustrated with cables 230 and 250. Pressurized sea-water produced by such a pump can be used, for example 1) to produce fresh water with a reverse osmosis unit, 2) to store the water for later use, such as in a water tower, or 3) to drive a device such as an impulse turbine to produce electricity.

By using sea-water as the fluid, a hydraulic system can be simplified to form an open loop system using only one pipe to transfer the sea-water for use or energy conversion for transmissible energy. The power input to the fluid by the pump is the flow rate of fluid multiplied by the pressure difference across the pump:

$$\text{Power}_{pump} = (\Delta P * Q)/\eta$$

where $\Delta P$=the pressure difference across the pump
Q=the flowrate of fluid through the pump; and
$\eta$=the pump efficiency.

The power expended to push the fluid through a pipe is a function of the velocity of the fluid in the pipe squared:

$$\text{Pressure Loss} = \frac{1}{2} * V^2 * \rho$$

where:

V=the velocity of fluid in pipe; and
$\rho$=the density of the fluid.

From these relationships it can be seen that for a fixed amount of power, doubling the pressure of the fluid requires that the fluid flowrate be reduced to ½ of the original. Reducing the flowrate also lowers the fluid velocity in the pipe to ½ of the original, which lowers the power expended to push the fluid through the pipe to ¼ of the original. From this it can be seen that the amount of energy expended transporting the energy absorbed by the wave energy kite can be reduced by increasing the pressure of the sea-water.

As with previous embodiments, the hydraulic system illustrated in FIG. 16A utilizes force transmitting lines such as the lines, or cables, 230 and 250 illustrated in the system 200 of FIG. 2, for example. These lines are connected, in this embodiment, from an energy absorbing kite such as the kite 852 or any other kite embodiments in accordance with the invention, to a winch drum 950. When the wave energy kite absorbs energy from the waves, it will move in a direction generally parallel to the direction of wave travel, and this, in turn, causes the force transmitting lines 230 and 250 to rotate the winch drum 950, the direction of rotation alternating between clockwise and counter-clockwise rotation in accordance with the reciprocating motion of the kite. Sea-water pumps 952 and 954 are each connected to, and driven by, the winch 950 to produce output flows of water under pressure from discharge pipes 956 and 958, respectively, when rotating in one direction. Accordingly, first one-way clutch 960, set to rotate clockwise, is installed between the winch drum 950 and the sea-water pump 952. Similarly, a one way clutch 962, set to rotate counter-clockwise, is installed between the winch drum 950 and the sea-water pump 954. Water to be pumped enters the pumps 952 and 954 through inlet pipes 964 and 966, respectively, and to prevent ingesting foreign objects, the sea-water enters the pumps through inlet strainers 968 and 970, respectively. To prevent the accumulation of marine biological fouling, the inlet strainers include cleaning devices such as scrapers 972 and 974, respectively.

It is desirable for the sea-water hydraulic system to maintain a constant pressure for transmissible energy. Recalling that the power produced by a pump is the fluid flow rate multiplied by the pressure difference across the pump, to maintain a constant outlet pressure the flowrate of the pump must vary proportionally with the velocity of the wave energy kite. The speed that the pumps 952 and 954 rotate is proportional to the velocity of the wave energy kite, which varies as the wave progresses past the wave energy kite. For each wave, the wave energy kite begins from a stationary position, accelerates to the maximum velocity of the wave opposite to the direction of wave travel, decelerates back to zero speed, accelerates to the maximum velocity in the direction of wave travel, and decelerates back to a stationary position. It was described earlier that the power of a wave is a function of the wave amplitude, not the wave velocity. Therefore, in order to maintain a constant pressure in the sea-water hydraulic system through the range of wave velocities and wave amplitudes, it is necessary to control the displacement of the pumps 952 and 954 per revolution of the pump.

A suitable positive displacement piston pump is illustrated in cross-section for pump 952 in FIG. 16B, it being understood that pump 954 is the same. Positive displacement pumps are a class of pumps which can maintain a constant pressure while the flowrate is changed. When the winch drum 950 is rotated, the appropriate one way clutch 960 or 962 causes a pump input shaft 980 to rotate. This causes the internal components of the pump 952 (or 954) to rotate, which causes the pistons 982 to reciprocate in their bores 984. In the first half of the cycle, the pistons increase the volume in the bores 984, creating a low pressure and thus drawing sea-water into the bores through the inlet strainer 968 (or 970) and through an inlet port in a valve plate 990. In the second half of the cycle, the pistons 982 reduce the volume in the bores 984, increasing the pressure of the sea-water and discharging it through a discharge port in the valve plate 990 and into discharge pipe 956 (or 958). The distance that the pistons 982 move in their bores 984, referred to as the stroke, is determined by the angle at which a swashplate 992 is oriented in the housing 994 of pump 952. If the swashplate 992 is vertical, the stroke of the pistons will be zero and the flowrate will be zero. The greater the angle of the swashplate from vertical, the greater will be the flowrate from the pump. The angle of the swashplate 992 is controlled by changing the position of a control rod 996, which causes a spherical surface 998 of the swashplate to rotate in a corresponding spherical socket 1000 in the housing 994. The position of the rod 996 is controlled by monitoring the hydraulic system pressure in discharge pipe 956 and the velocity of the wave impinging on the kite member or wave energy absorbing panel.

The kite members or wave energy absorbing panels described above may be fabricated from a variety of materials. For example, for embodiments requiring a rigid panel member, a number of metals would be suitable such as: Aluminum, Carbon Steel, Stainless Steel, Duplex Stainless Steel, Titanium, and related alloys. For panels made of a composite, options include: Polyester resin w/Glass Fibers, Polyester resin w/Kevlar Fibers, Polyester resin w/Carbon Fibers, Epoxy resin w/Glass Fibers, Epoxy resin w/Kevlar Fibers, Epoxy Resin w/Carbon Fibers, and Polyethylene. For installations requiring a kite member constructed as a flexible membrane, suitable materials include: Nylon, Polyester, Mylar, Lycra, Rubberized Fabrics, and Neoprene.

Broadly speaking, the system and method of the present invention provides a wave energy kite configured to capture energy from ocean waves at a selected situs having an ocean mean waterline above an ocean bottom surface or sea floor and has at least a first reciprocating energy absorbing kite panel, such as the panel 202 in FIG. 2, submerged in a substantially vertical orientation, where the kite panel has a first side surface (e.g., 212) opposing a second side surface (e.g., 222). The system also has a first plurality of tension-force transmitting members or suspension lines (e.g., 214) each having a proximal end opposite a distal end, each line's proximal end being connected to the kite's first side surface and wherein each of the lines extend distally in a substantially perpendicular alignment away from the kite's first side surface. The kite panel also has a second plurality of tension-force transmitting members or suspension lines (e.g., 224) each having a proximal end opposite a distal end, each second plurality line's proximal end being connected to the kite's second side surface and extending distally in an alignment opposing the alignment of the first suspension lines, so that the second suspension lines extend distally away from the kite's second side surface. A pulley or block and tackle tension force transmission system (e.g., 232, 234, 252, 254) is configured to receive and support the first and second suspension lines (e.g., 214, 224), and a power converter such as an electrical generator (e.g., 240) or a hydraulic pump (e.g. 952), preferably fixed to the sea bottom, is configured to generate transmissible output power in response to the kite's reciprocating motion. The tension and energy are transmitted through the first and second suspension lines (e.g., 214, 224) preferably, via winch drums (e.g., 238 and 258), which are connected to the power converter in such a manner that the first and second suspension lines will cause the converter to generate power as the reciprocating or oscillating forces of ocean waves act on the energy absorbing kite member.

As noted above, the preferred embodiments for the present invention are configured to function optimally with the features of a selected situs. "Situs" as used here, means a location selected for installing and operating the ocean wave energy absorbing kite system of the present invention. In accordance with the method for efficiently harnessing kinetic and potential energy of ocean wave of the present invention, a proper situs must be selected and then the system of the present invention must be configured for the selected situs. As noted above, for an exemplary installation near a shoreline, with a situs mean depth of fifty feet, the vertical extent or height of the submerged kite member would preferably be about twenty five feet and the kite member's length would preferably be one hundred feet. Thus, for a selected situs having a selected mean depth, the height of the kite member is always less than the mean depth, in the range of $\frac{1}{3}$ to $\frac{2}{3}$ of that mean depth and that kite member height is preferably about half the mean depth. Also, for that selected situs, the lateral width of the submerged kite member is greater than the mean depth and so is significantly greater than the submerged kite member height. Preferably, the kite member's lateral width is in the range of two to four times the mean depth and four or more times the kite member's height.

The system and method of the present invention provides a practical and economical way to generate energy from ocean waves and the system of the present invention is more economical to install and operate that systems of the prior art. An example can illustrate this comparison more clearly.

Cost Comparison Example

For a 100 kW output wave energy kite installed off of the coast of Ocean City, Md. in 50 ft. of water depth, a wave energy kite installed in accordance with the teachings of the present invention has a kite member which is 96 ft. wide, parallel to the wave crest, and 24 ft. high. The membrane of the wave energy kite is constructed from heavy gauge rip-stop nylon. Nylon reinforcing webs are sewn to the membrane so that the force absorbed by the kite and transmitted to the suspension lines is uniformly distributed throughout the membrane. Pockets are sewn into the reinforcing webs to receive buoyancy chambers sufficient to make the kite slightly buoyant. Fifteen suspension lines are connected to one side of the kite with the lengths of the lines varied so that the kite membrane forms a plane when the suspension lines are joined together, along the centerline, with a force transmitting line approximately 75 ft. from the face of the kite. A second set of suspension lines is attached to the opposite side of the wave energy kite in a mirror image.

Two foundations are made to support the pulleys, using concrete reinforced with an internal steel structure. A similar foundation is made to support a winch/generator assembly and a haul-down winch. The foundations are anchored to the sea bottom in approximately 50 ft. of water depth. The wave energy kite and suspension line assemblies are brought to the site and the force transmitting lines are passed through the pulleys and connected to their respective winch drums on the winch/generator assembly. The winch drums are disengaged from the generator and rotated to wind on the force transmitting lines. The winch drums are rotated individually and the position of the kite is monitored so that the appropriate winch drum is rotated to a position where the kite is approximately an equal distance between the two pulleys.

The following Table (Table 1) illustrates in a rough order of magnitude a cost estimate for the foregoing wave energy kite installation:

TABLE 1

| Description | Estimate |
| --- | --- |
| Permits | $25,000 |
| Reinforced Kite | $24,000 |
| Suspension Lines | $18,000 |
| Pulleys | $4,000 |

TABLE 1-continued

| Description | Estimate |
| --- | --- |
| Generator/Winch Drums | $50,000 |
| Transmission | $30,000 |
| Haul Down Winch | $5,000 |
| Foundations | $10,000 |
| Set Foundations | $25,000 |
| String Suspension Lines | $10,000 |
| Run Electric Cable 1 mile | $260,000 |
| Pre Commissioning Checks | $20,000 |
| Total | $481,000 |

This results in an installed cost of $4,810/kW and $1,410/kW for the hardware.

As a comparison, the Offshore Power Technologies™ Mark 3™ PowerBuoy™ is rated at a peak generating capacity of 866 kW but the continuous rating is 200 kW. The overall length is 143 ft. long and the buoy is 36 ft. in diameter. The weight is 180 tons or nearly 400,000 lbs. The actual cost of the unit is not known; however, the purchase price of steel is approximately $1 per lb. and welded structures are 4 to 6 times that. Using $5 per lb. the steel alone would cost $2,000,000. The unit requires a water depth greater than 180 ft. which greatly increases the cost of the foundations and of installation. The unit is installed a few miles off shore which increases the cost of running the electric power to the shore. Accordingly, the estimated installed cost for a prior art ocean wave energy generator system is illustrated in Table 2, as shown below:

TABLE 2

| Description | Estimate |
| --- | --- |
| Permits | $30,000 |
| Steel Structure | $2,000,000 |
| Machined Parts | $200,000 |
| Generator | $175,000 |
| Generator Drive Cables | $50,000 |
| Three point Mooring | $150,000 |
| Anchor Foundations | $60,000 |
| Connect Anchor Lines | $30,000 |
| Run Electric Cable 5 miles | $1,260,000 |
| Pre Commissioning Checks | $20,000 |
| Total | $3,975,000 |

This results in an installed cost of $19,875/kW and $12,875/kW for the hardware, which represents a substantially greater cost than the system of the present invention.

For purposes of nomenclature, the terms "sea" and "ocean" have been used to describe the fluid medium from which the submerged kite system of the present invention may recover kinetic and potential energy. It should be understood that those terms are to be construed to include any body of water anywhere in the world having a surface with ambient waves with recoverable kinetic and potential energy.

The present invention has been shown and described herein in what are considered to be the most practical and preferred embodiments. It is recognized, however, that departures may be made therefrom within the scope of the invention, and that obvious modifications will occur to a person skilled in the art.

What is claimed is:

1. A submerged ocean wave energy responsive kite system comprising:
    a) an energy absorbing panel in a substantially vertical orientation that has a first surface opposing a second surface,
    b) a plurality of first suspension lines which are connected to said first surface of the energy absorbing panel and are substantially perpendicular to said first surface of the energy absorbing panel,
    c) a first winch drum connected to said first suspension lines configured to maintain a tensile force in said first suspension lines,
    d) a first power converter connected to said first winch drum fixed to the sea bottom configured to create power,
    e) a plurality of second suspension lines which are connected to said second surface of the energy absorbing panel and are substantially perpendicular to said second surface of the energy absorbing panel,
    f) a second winch drum connected to said second suspension lines configured to maintain a tensile force in said second suspension lines,
    g) a second power converter connected to said second winch drum fixed to the sea bottom configured to create power when said energy absorbing panel reciprocates, moving left to right and then right to left in a substantially horizontal motion in response to a passing ocean wave's orbital velocity which is transmitted by said first suspension lines and said second suspension lines to said first and second winch drums, and
    h) a means to transmit the created power for useful purposes.

2. The submerged ocean wave energy responsive kite system of claim 1, further comprising:
    i) adjusters connected to said first and second suspension lines to orient said energy absorbing panel with respect to the direction of said passing ocean waves.

3. A method for efficiently harnessing kinetic and potential energy of ocean waves to generate electrical or hydraulic power, comprising the steps of:
    a) securing a wave motion responsive kite member to a fixed foundation at an offshore situs, and aligning said kite member in a substantially vertical orientation with opposing kite member left and right surfaces, whereby said kite member is responsive to horizontal and vertical vectors of motion of said ocean waves to move with respect to said fixed foundation; and
    b) connecting said opposing kite member left and right surfaces by way of movable horizontal or lateral force transmitting cables (e.g., 230, 250) and vertical suspension lines (e.g., 454) to a power convertor (e.g., 460) to cause said convertor to produce an output power in response to reciprocating motion of said kite member when said kite member moves left to right and then right to left in a substantially horizontal motion in response to a passing ocean wave's orbital velocity.

4. The method of claim 3, further including the method steps of:
    c) adjusting said horizontal or lateral force transmitting cables to adjust the orientation of said kite member with respect to impinging waves, and
    d) adjusting said vertical suspension lines to adjust the depth of said member.

5. The method of claim 4, wherein the method step of adjusting said horizontal or lateral force transmitting cables to adjust the orientation of said kite member with respect to impinging waves, comprises:
    applying tension to some of said horizontal or lateral force transmitting cables so that said kite member's opposing first and second surfaces remain perpendicular to the direction of wave travel and parallel to a shoreline.

6. The method of claim 5, wherein the method step of adjusting said horizontal or lateral force transmitting cables to adjust the orientation of said kite member with respect to impinging waves, further comprises:

adjusting first and second diagonally opposed capstans to reduce the length of selected opposed lateral force transmitting cables or control lines, and, at the same time, adjusting two other diagonally opposed capstans to increase the length of other lateral force transmitting cables or control lines to cause the kite member to pivot substantially about a kite vertical centerline so that said kite remains perpendicular to the direction of wave travel.

* * * * *